United States Patent [19]

Tanaka et al.

[11] Patent Number: 4,905,042

[45] Date of Patent: Feb. 27, 1990

[54] IMAGE FORMING APPARATUS

[75] Inventors: Sohei Tanaka, Yokohama; Koki Kuroda, Tokyo; Yoshitaka Ogino, Kawasaki, all of Japan

[73] Assignee: Canon Kabushiki Kaisha, Tokyo, Japan

[21] Appl. No.: 253,330

[22] Filed: Oct. 3, 1988

Related U.S. Application Data

[63] Continuation of Ser. No. 674,551, Nov. 26, 1984, abandoned.

[30] Foreign Application Priority Data

Nov. 25, 1983 [JP] Japan ................................ 58-222539
Nov. 25, 1983 [JP] Japan ................................ 58-222540
Nov. 25, 1983 [JP] Japan ................................ 58-222541

[51] Int. Cl.⁴ ........................ G03B 27/52; G03B 27/34
[52] U.S. Cl. ......................................... 355/56; 355/58
[58] Field of Search .................................... 355/55-58, 355/8, 14 SH, 52; 364/518

[56] References Cited

U.S. PATENT DOCUMENTS

| | | | |
|---|---|---|---|
| 3,897,148 | 7/1975 | Ritchie et al. | 355/58 X |
| 3,967,898 | 7/1976 | Klann | 355/84 |
| 4,111,151 | 9/1978 | Klann | 355/52 X |
| 4,372,676 | 2/1983 | Miyata et al. | 355/55 X |
| 4,394,083 | 7/1983 | Rees | 355/52 X |
| 4,448,517 | 5/1984 | Hayashi | 355/56 |
| 4,552,447 | 11/1985 | Sagara et al. | 355/55 |
| 4,552,450 | 11/1985 | Tomosada et al. | 355/56 X |
| 4,552,453 | 11/1985 | Iwamoto et al. | 355/58 X |
| 4,557,593 | 12/1985 | Iwanada | 355/57 |
| 4,583,846 | 4/1986 | Nakamura et al. | 355/57 X |
| 4,589,763 | 5/1986 | Fujiwara | 355/14 SH X |

*Primary Examiner*—L. T. Hix
*Assistant Examiner*—D. Rutledge
*Attorney, Agent, or Firm*—Fitzpatrick, Cella, Harper & Scinto

[57] ABSTRACT

An image forming apparatus comprises an optical system for regenerating an original manuscript; a regenerating member capable of regenerating the original manuscript in different modes; a means for setting the position of the optical system in accordance with respective modes; a detector for detecting information relating to the respective modes from the set position of the optical system, and a control device for controlling the regenerating member in accordance with the detected information by the detector. A protective apparatus is further provided which comprises a process load; a detector for detecting a continuous operation time of the load from the power frequency of an a.c. current supplied to the load, and a control device for controlling the operation of the process load in accordance with the output from the detector. The process load may be a lamp for exposing light on an original manuscript.

12 Claims, 23 Drawing Sheets

| | R11 | R12 | R13 |
|---|---|---|---|
| K1 | MINUS KEY (−) 46c | CLEAR/STOP KEY 46d | SIZE CHANGE 1 |
| K2 | COPY KEY 46e | PLUS KEY (+) 46b | SIZE CHANGE 2 |
| K4 | | PAPER EJECTION SENSOR Q3 | HP, BP SENSOR MS 3 |
| K8 | JAM KILLER | PAPER FEEDER SENSOR Q2 | REGISTRATION POSITION SENSOR MS4 |
| A1 | THERMO CONTROL DEVICE | | ANALOG INPUT |

| | |
|---|---|
| R0 | NO USE |
| R1 | CASSETTE PAPER FEEDER SOLENOID (SL301) |
| R2 | ORIGINAL BOARD FORWARD SOLENOID (SL2) |
| R3 | ORIGINAL BOARD STOP SOLENOID (SL1) |
| R4 | REGISTRATION SHUTTER SOLENOID (SL3) |
| R5 | POWER SUPPLY LAMP 48a |
| R6 | BIAS CHANGE CIRCUIT |
| R7 | HIGH VOLTAGE CIRCUIT HV |
| R8 | MAIN MOTOR M1 |
| R9 | HALOGEN LAMP LA1 |
| R10 | HALOGEN HEATER H1 |
| R14 | PAPER FEEDER SOLENOID (SL4) |
| $O_0$ ~$O_7$ | SEGMENT DISPLAY 46a   |
| R11 | JAM DISPLAY LAMP 48b |

| | R11 | R12 | R13 |
|---|---|---|---|
| K1 | MINUS KEY (−) 46c | CLEAR/STOP KEY 46d | MS 5 |
| K2 | COPY KEY 46e | PLUS KEY (+) 46b | MS 6 |
| K4 | | PAPER EJECTION SENSOR Q3 | HP, BP SENSOR MS 3 |
| K8 | JAM KILLER | PAPER FEEDER SENSOR Q2 | REGISTRATION POSITION SENSOR MS4 |
| A1 | THERMO CONTROL DEVICE | | ANALOG INPUT |

IMAGE FORMING APPARATUS

This application is a continuation of application Ser. No. 674,551 filed Nov. 26, 1984, now abandoned.

BACKGROUND OF THE INVENTION

1. Field of the Invention

The present invention relates to an image forming apparatus such as a copying machine.

2. Description of the Prior Art

A protective device for a copying machine known in the art is provided aiming at operating in an obviously abnormal state, such as when the exposure lamp for an original manuscript is continuously illuminated. One of such protective devices is so constructed as to detect an abnormal temperature around the exposure lamp to thereby protect it. In the copying machine with such a protective device, a problem arises, therefore, that the protective device does operate until the temperature rises to a substantially large one.

Furthermore, after detecting a continuous illumination, in order to precisely set a time period during which the protective device operates, it is required to provide a pulse oscillator for supplying pulses to a counter which measures the time period, a circuit for starting and stopping the operation of the counter, and similar complicated circuits. Therefore, some disadvantages arise that the reliability of the protective device is degraded and that the device becomes expensive.

In an image forming apparatus having a size change function, an image to be formed from an original manuscript may be required to reduce in size only in the scanning direction on the original. In this case, as is similar to the case wherein the size in both vertical and lateral directions of the original is reduced by the same reduction ratio, an image can be obtained whose size is reduced only in the scanning direction of the original, by setting a reduction ratio in the scanning direction alone. However, in this case, since a timing (registration timing) for feeding a recording medium to the image forming apparatus is set identically with that of the preset reduction mode, there arises a problem that an image is formed to be biased in position in the transporting direction of the recording medium.

SUMMARY OF THE INVENTION

It is an object of the present invention to eliminate the above mentioned disadvantages.

It is another object of the present invention to improve an image forming apparatus.

It is still another object of the present invention to provide an image forming apparatus with high reliability.

It is a further object of the present invention to provide a protective device which is high in reliability and safety.

It is still a further object of the present invention to provide a protective device which is simple in structure and high in reliability.

It is an additional object of the present invention to provide an image forming apparatus which can perform a desired recording with a simple structure.

It is an even further object of the present invention to provide an image forming apparatus which in a particular image forming mode, can form an image on a desired portion of a recording medium by making an appropriate change of a registration timing, and in which the setting of the registration timing can be readily done by using another registration timing of another image forming mode.

It is another object of the present invention to provide an image forming apparatus extremely safe in operation in which a mode information is detected out of the lens mechanically set, and delivered out to a control section, that is, in other words, an electrical mode setting is performed in association with a mechanical mode setting.

Other objects of the present invention will become apparent from the following description with reference to the accompanying drawings and claims.

BRIEF DESCRIPTION OF THE DRAWINGS

FIG. 16 is a schematic view showing connection conditions between ports of the CPU shown in FIG. 13, and sensors and input keys and the like;

FIG. 17 is a timing chart showing the timings of pulse outputs of output ports of the CPU;

FIG. 18 is a schematic diagram showing connection conditions between the output ports of the CPU, and each solenoid or the like;

FIG. 19 is a flow chart showing an example of a processing sequence relating to transporting control of an original manuscript board, setting of a registration timing, and the like;

FIG. 20 is a diagrammatic view for illustrating a relation between a black-out lamp and an image area on a photosensitive drum according to a second embodiment;

FIG. 23 is a schematic view showing connection conditions between ports of the CPU of FIG. 22, and sensors and input keys and the like; and FIG. 24 is a flow chart showing one example of a processing sequence relating to transporting control of an original manuscript board, setting of a registration timing, and the like.

DETAILED DESCRIPTION OF THE PREFERRED EMBODIMENTS

The present invention will now be described with reference to the accompanying drawings.

Figure 1:
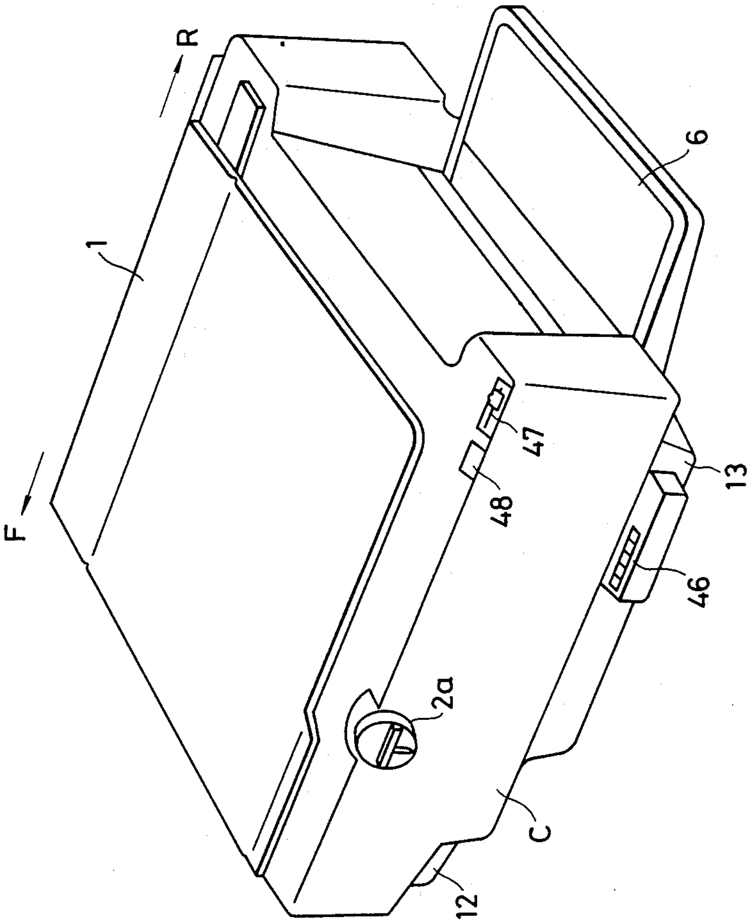
FIG. 1 is a perspective view showing an example of the structure of a copying machine according to an embodiment of the present invention.
Figure 2:
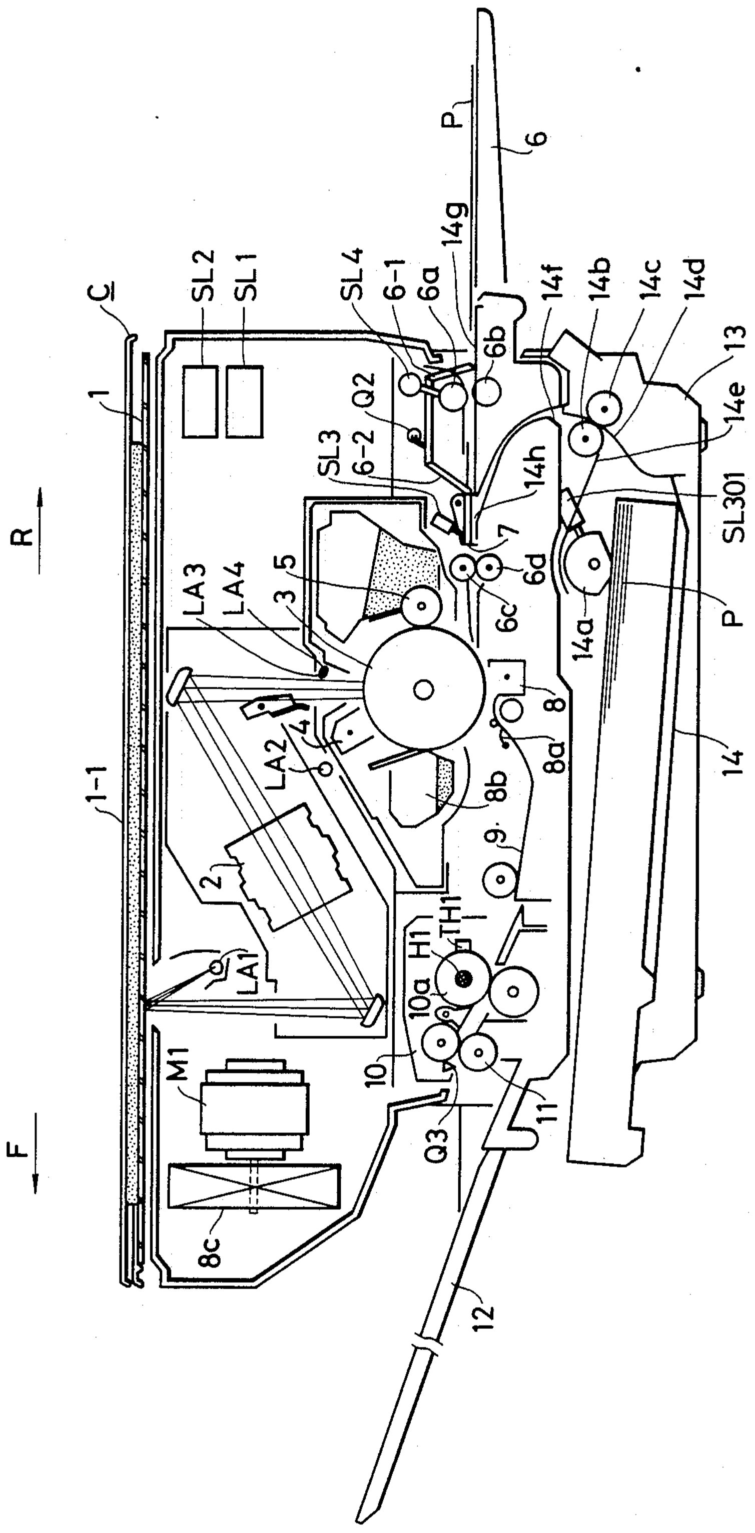
FIG. 2 is a sectional view of the structure of FIG. 1.

FIGS. 1 and 2 are perspective and sectional views showing one example of a structure of a copying machine according to the present invention. In the figures, reference number 1 denotes a rest made of transparent material on which a manuscript or the original to be copied is placed. A pushing plate 1-1 is mounted over the rest 1 for fixing the original onto the rest. An original board constructed of both rest 1 and plate 1-1 is moved forward in an F arrow direction and moved backward in a R arrow direction.

The image of the original placed on the original board 1 is reflected under illumination of a halogen lamp LA1, and the reflected original image is slit-exposed through a focusing lens 2 onto a photosensitive drum 3. A focal length of the lens 2 is changed with a size change setting dial 2a by an operator in accordance with a preset magnification.

Reference number 4 denotes a charger which charges uniformly the surface of the photosensitive drum 3. The uniformly charged drum 3 is then exposed with lights through the focusing lens 2 in accordance with the reflected image, and corresponding electrostatic image is formed thereupon.

In the copying machine according to the embodiment, it is assumed that the following respective modes can be selectively set.

(1) equal size mode: copying in the same size as the original and capable of copying at the maximum up to an A4 modified (letter) size original.

(2) magnification or enlargement mode: copying by magnifying the size of the original.

(3) reduction 1 mode: copying by reducing the size of a recording image of the original image by a ratio of 1:0.786 and capable of copying a B4 size original at the maximum onto a A4 size of a recording paper.

(4) reduction 2 mode: copying by reducing the size of a recording image of the original by a ratio of 1:0.667.

(5) B5 block mode: copying by removing a black portion other than that corresponding to the original image, which portion is generated in the case, for example, copying a book or the like whose size is of a B5 when opened onto a recording paper of an A4 size.

(6) single size change mode: copying by reducing only in the scanning direction of the original image.

Thus, among the size change modes, if a reduction mode is set in which the width of an image area relative to the advancing direction is smaller than the A4 size (or a letter size), black-out lamps LA3 and LA4 are turned on while the original board 1 moves forward during the formation of the electrostatic image, thus preventing an additional toner depositing on a non-image area.

Figure 3:
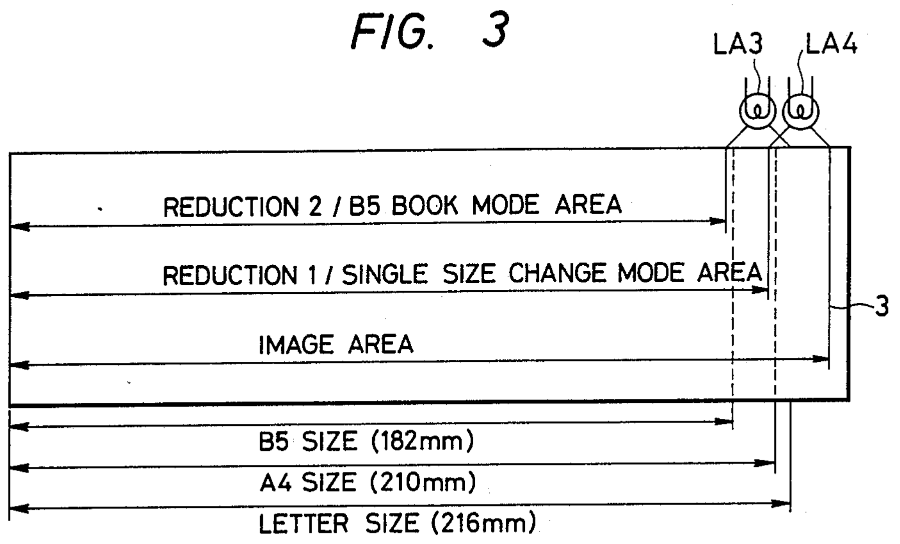
FIG. 3 is a diagrammatic view showing a relation between a black-out lamp and an image area on a photosensitive drum.

FIG. 3 shows a relation between the positions of the black-out lamps LA3 and LA4, and the image area on the photosensitive drum 3. In addition, in Table 1, the states of the black-out lamps LA3 and LA4 relative to the particular modes are shown.

TABLE 1

| MAGNIFICATION | BLACK-OUT LAMP LA3 | BLACK-OUT LAMP LA4 |
|---|---|---|
| SAME SIZE MODE | OFF | OFF |
| MAGNIFICATION MODE | OFF | OFF |
| REDUCTION 1 MODE | OFF | ON |
| REDUCTION 2 MODE | ON | ON |
| B5 BLOCK MODE | ON | ON |
| SINGLE SIZE CHANGE MODE | OFF | ON |

As shown in Table 1, even if the same A4 or letter size recording paper is used for copying, the illumination state of the black-lamp LA3 or LA4 differs in correspondence with the selected magnification mode.

A development apparatus 5 conspicuously generates an electrostatic image. A transfer material or a recording paper P is fed with hand on a hand feeding stand 6, and a paper feeder sensor Q2 is turned on when it detects the hand feeding of the transfer material P, which in turn energizes a solenoid SL4. Accordingly, a paper feeding roller 6a which is always rotating comes down to a fixed roller 6b to hold the material P therebetween and to transport it. The paper feeder sensor Q2 is driven by detection arms 6-1 and 6-2 extending in front of and at the back of the paper feeding roller 6a, and it turns on when either the arm 6-1 or 6-2 is lifted up by the feeding paper.

A registration shutter 7 always positions so as to intercept a transporting path 14h while a solenoid SL3 is not energized. As a result, the transfer material P stops with its tip abutting the shutter 7. As the tip of the transfer material P is engaged with the shutter 7, it slips between the rollers 6a and 6b so that it is not transported over the shutter 7, and the solenoid SL4 is deenergized. By driving again the solenoid SL4 and supplying a registration signal to the solenoid SL3, the shutter 7 is raised up to thereby transport the transfer material P toward the continuously rotating photosensitive drum 3 by means of rollers 6c and 6d. The toner image formed on the photosensitive drum 3 is transferred onto the transfer material P with a transfer charger 8.

Thereafter, the transfer material P separated from the drum 3 with a separation belt 8a is guided into a fixing apparatus 10 along a guide 9, and after the toner image on the transfer material P is fixed with a fixing roller 10a having therein a halogen heater H1, the transfer material P is ejected out on a tray 12 by a paper ejection roller 11.

Reference Q3 denotes a mechanical paper ejection sensor which detects mechanically or electrically the paper and outputs a detection signal. Reference TH1 denotes a thermistor which detects the temperature of the fixing roller in the fixing apparatus 10.

Then, a residual toner on the drum 3 is scraped off with a cleaner 8*b* so as to be ready to a next use. Reference 8*c* denotes a cooling fan which ejects out a warm air in the copying machine into the air.

A not shown rack is mounted under the original board 1, and by driving a pinion meshing with the rack into rotation, the original board 1 can be moved either in the F direction or in the R direction. Reference SL1 denotes an original board stop solenoid for controlling a retreat clutch, and reference SL2 denotes an original board advance solenoid for controlling an advance clutch, wherein the rotation of the motor M1 is transmitted through the advance and retreat clutches to the pinion in order to control the movement of the original board 1.

The lens 2 is mechanically moved upon rotation of the motor M1 in accordance with a magnification mode set by the size change setting dial 2A. Further, as will be described later with reference to FIG. 13, the size change setting dial 2*a* is connected to a rotary switch SW701 to deliver a signal corresponding to the magnification selected by an operator to a CPU Q203 and to illuminate the black-out lamps LA3 and LA4 in the manner shown in Table 1. The rotary switch SW701 has four cooperative circuits SW701-A, SW701-B, SW701-C, and SW701-D. The circuits SW701-A and SW701-B deliver magnification signals to the CPU Q203 as shown in Table 3, and the CPU Q203 reads the signal just before the advancement of the original board 1. The circuits SW701-C and SW701-D are connected to the black-out lamps.

TABLE 2

| MAGNIFICATION | ROTARY SWITCH SW701-A | ROTARY SWITCH SW701-B |
|---|---|---|
| SAME SIZE MODE | ON | OFF |
| MAGNIFICATION MODE | OFF | OFF |
| REDUCTION 1 MODE | ON | ON |
| REDUCTION 2 MODE | OFF | ON |
| B5 BLOCK MODE | OFF | OFF |
| SINGLE SIZE CHANGE MODE | ON | ON |

In the copying machine according to the embodiment, a manual paper feeder is provided by which a single piece of transfer material P can be fed by hand. However, a continuous feeding by a cassette 14 may be employed by coupling an attachment 13 below the main body C of the copying machine, so long as a large number of transfer materials are required to be continuously copied.

The attachment 13 is provided with a paper feeding roller 14*a* and transporting rollers 14*b* and 14*c* continuously rotating, and a transporting path defined by transporting guides 14*d* and 14*e* is communicated with a transporting path formed in the main body C.

The transporting path 14*f* and the transporting path 14*g* for the manual paper feeder are led into the transporting path 14*h* following both transporting paths 14*f* and 14*g*, and the tip of the transfer material P is stopped by the registration shutter mounted on the transportation path 14*h*.

Reference number 46 denotes a manual operation section which has a copy key and an operation and display section. Reference numbers 47 and 48 are operation sections mounted on the main body C of the copying machine, representing respectively a density adjustment lever and a power source and jam display section.

Figure 4:
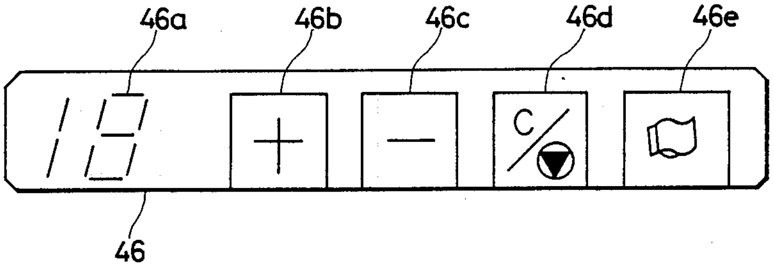
FIG. 4 is a plan view showing one example of a structure of an operating section.

FIG. 4 shows the operation section 46, wherein reference number 46*a* designates a segment display capable of displaying the number of copies up to 19 sheets at the maximum, references 46*b* and 46*c* designate respectively plus and minus keys for setting the number of copies, the number of copies being count up and count down at predetermined time intervals in accordance with the depression thereof.

Reference 46*d* denotes a clear/stop key which has a function to clear the number of copies as set and a function to stop the operation of copying during copying. Reference 46*e* denotes a copy key to start the copying operation of the copying machine. The segment display 46*a* flashes "P", if the paper feeder sensor Q2 does not turn on after the predetermined time lapse from the time instant when the cassette paper feeder solenoid is driven, that is, if such state is brought about as a paper feeding operation has failed, or no paper exists.

Figure 5:
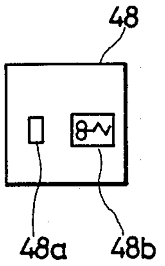
FIG. 5 is a plan view showing one example of a structure of a jam indication section.

FIG. 5 shows the jam indication section, wherein reference 48*a* denotes a power source lamp which turns on when power is supplied to the copying machine, and reference 48*b* denotes a jam indication portion which indicates that the transfer materials are jammed in the copying machine.

Two microswitches MS3 and MS4 are mounted on a part of the main body relative to the original board 1, and cams are mounted on the original board 1 relative to the microswitches MS3 and MS4.

Figure 6A:
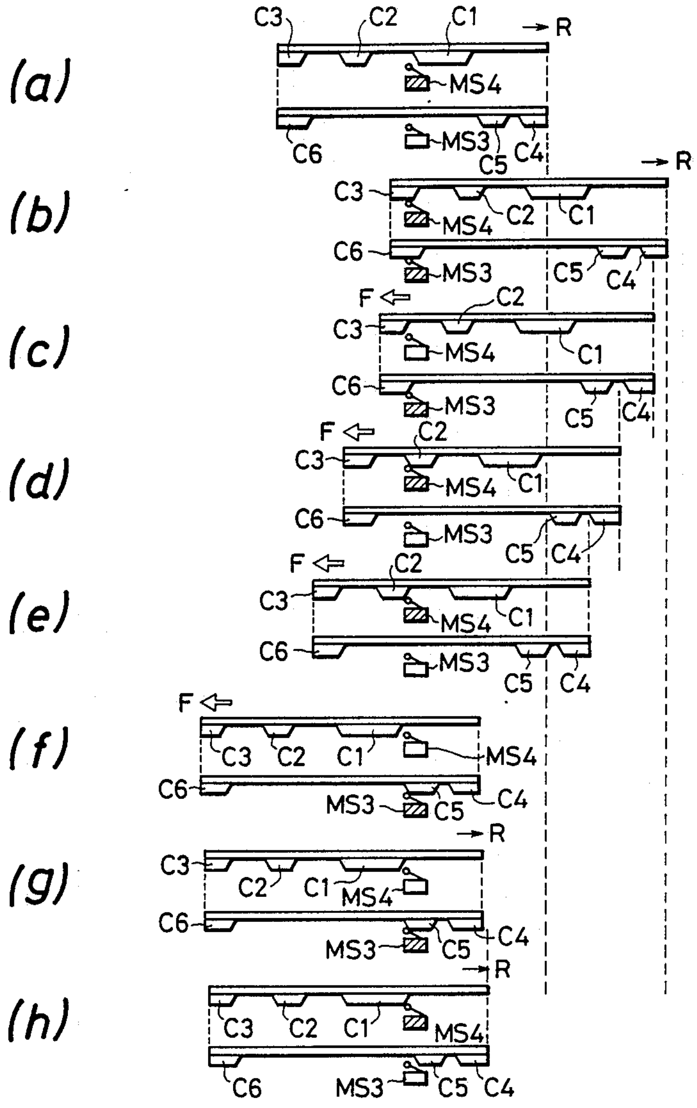
FIG. 6A is a diagrammatic view for illustrating a sequential operation of cams and microswitches in a magnification mode.
Figure 7A:
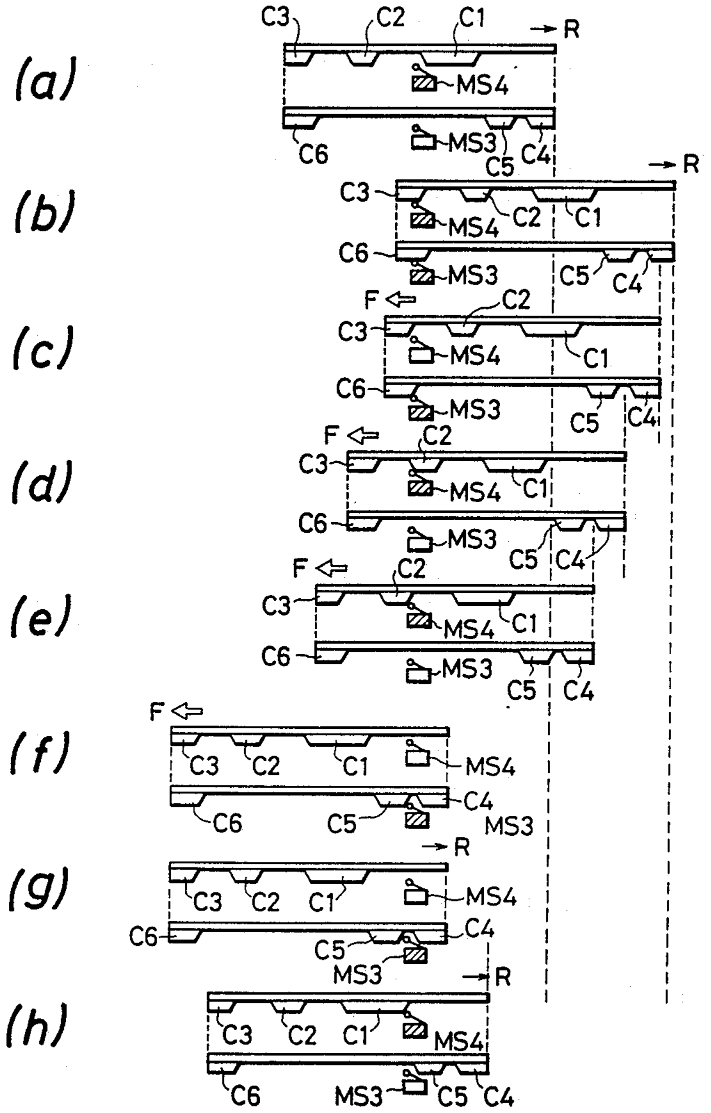
FIG. 7A is a diagrammatic view for illustrating a sequential operation of the cams and the microswitches in an equal size mode.
Figure 8A:
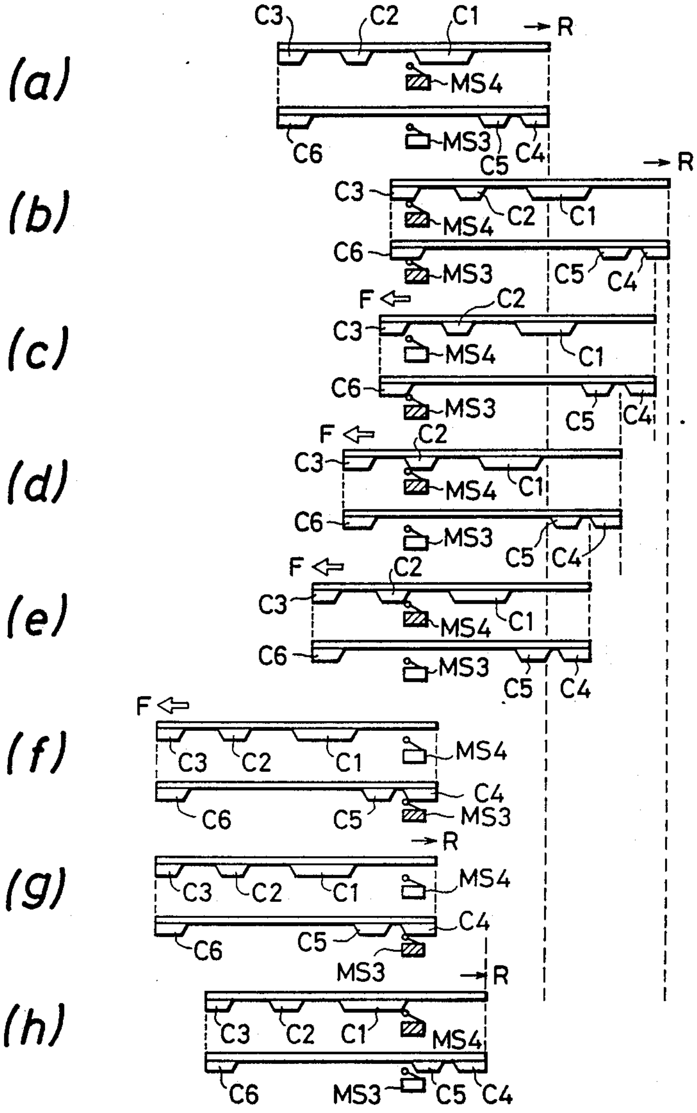
FIG. 8A is a diagrammatic view for illustrating a sequential operation of the cams and the microswitches in a reduction mode 1 and a reduction mode 2.

FIGS. 6A, 7A, and 8A respectively show cam arrangements and associated microswitch operations in respective selected magnifications. As seen from the figures, reverse cams C4, C5 and a start position cam C6 are mounted in operative association with the microswitch MS3, and a home position cam C1, resist cam C2, and start position cam C3 are mounted in operative association with the microswitch MS4. These microswitches are adapted to turn on when pushed by the corresponding respective cams. A copying sequence at each magnification mode, particularly as to the relation between the cams and microswitches, is described with reference to (a) through (h) in FIGS. 6A, 7A, and 8A.

Figure 6B:
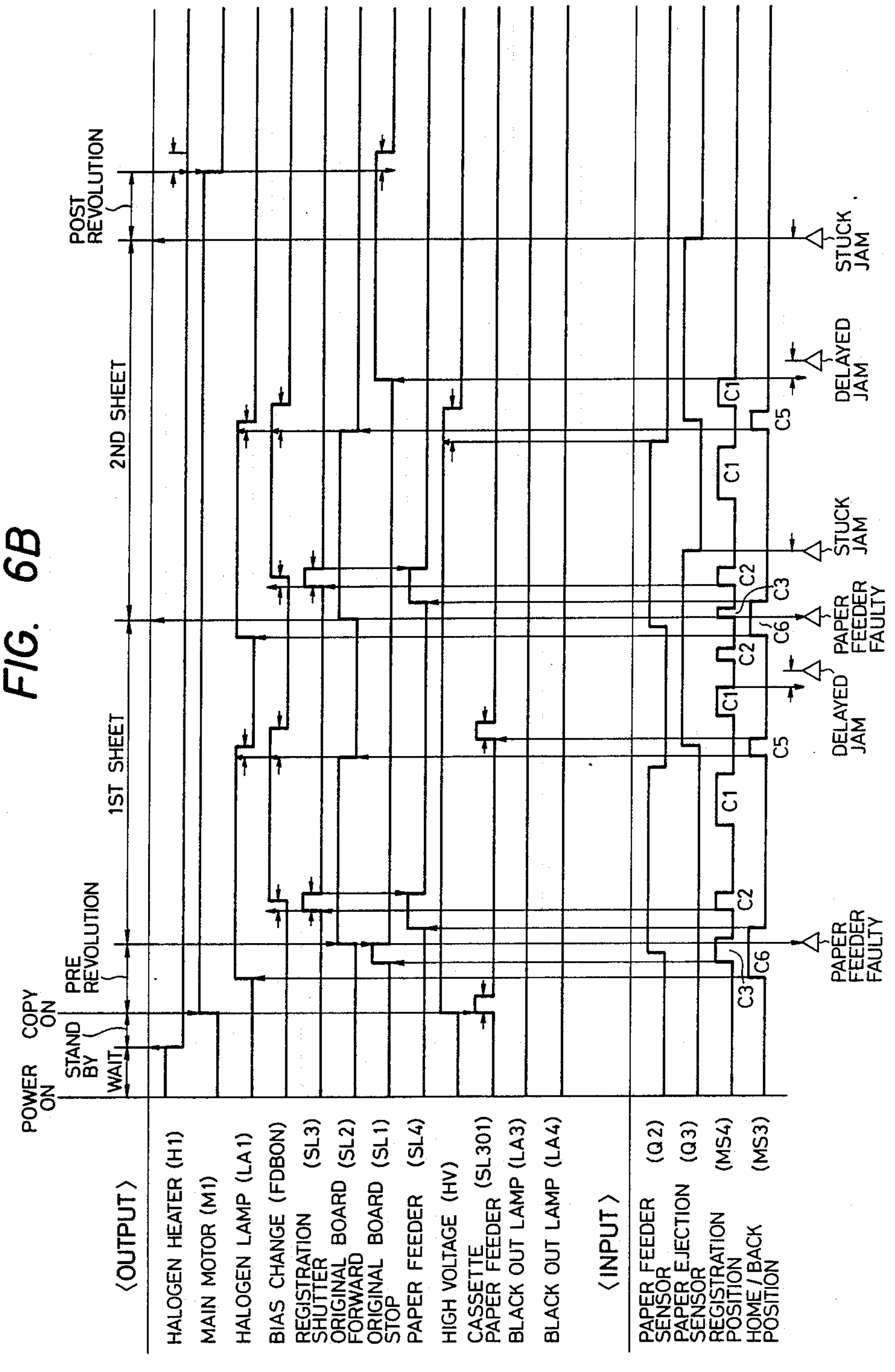
FIG. 6B is a timing chart showing the operation timings at each section in the magnification mode.

First, in FIG. 6A, an operational state of the cams and microswitches at a magnification mode is shown, and in FIG. 6B, a timing chart at the magnification mode is shown.

As shown in (a) of FIG. 6A, the original board 1 starts moving backward in the arrow R direction. Then, the cam switch C1 and the microswitch MS4 become separate from each other to cause the microswitch MS4 to turn off from its turn-on state. As a result, every time after completion of copying a single sheet of recording paper, an output delayed jam check for detecting whether a delayed jam has been generated at the output or not, is executed, and further an output stop jam check for detecting whether a stop jam has been generated at the output or not, is started. And at the end of the copying, the solenoid SL1 is turned on to stop the original board 1.

Next, as shown in (b), the halogen lamp LA1 is turned on when the microswitch MS3 is turned on. And when the microswitch MS4 is also turned on, the solenoid SL1 is turned on. In the case the cassette 14 is used for paper feeding, a paper feeder faulty check is performed.

Further, as shown in (c), as the original board 1 advances in the arrow F direction and the microswitch MS3 turns on from its off state, the manual paper feeder solenoid SL4 is turned on.

Next, as shown in (d), as the microswitch MS4 turns on from its off state, then the registration shutter solenoid SL3 is turned on and a timer which determines an on time of the registration shutter solenoid SL3 is actuated. Succeedingly, the bias for the development is changed within a preset time so as to obtain an image corresponding in density to the value indicated by a copy intensity lever 47. In response to the time up of the timer, the resist shutter solenoid SL3 is turned off, and the hand paper feeding solenoid SL4 is turned off.

Next, as shown in (e), no operation is carried out under the state in which the microswitch MS4 turns on from its off state.

Next, as shown in (f), as the microswitch MS3 turns on from its off state, the original board advance solenoid SL2 is turned off to initiate a reverse control for the direction of movement. After a certain time lapse therefrom, the halogen lamp LA1 is turned off, and in the case that a plurality of copies for the same original is required (continuous copying), the cassette paper feeder solenoid SL301 is turned on in order to enable to perform the second and following copying operations. In addition, a development bias changing timer is actuated, and in response to the time-up of the timer, the image bias is changed over to a non-image bias. In (g) and (h), the conditions wherein no operations are performed in the magnification mode are shown. A continuous copying is carried out by repeating the processes beginning with (a) above.

The timing chart showing these operation timings at each section in the magnification mode is in FIG. 6B. In the figure, C1 to C3, C5, and C6 indicate that by which cam each microswitch is turned on or off, and →← indicates a timer time. These designations are also applicable to FIGS. 7B and 8B.

Figure 7B:
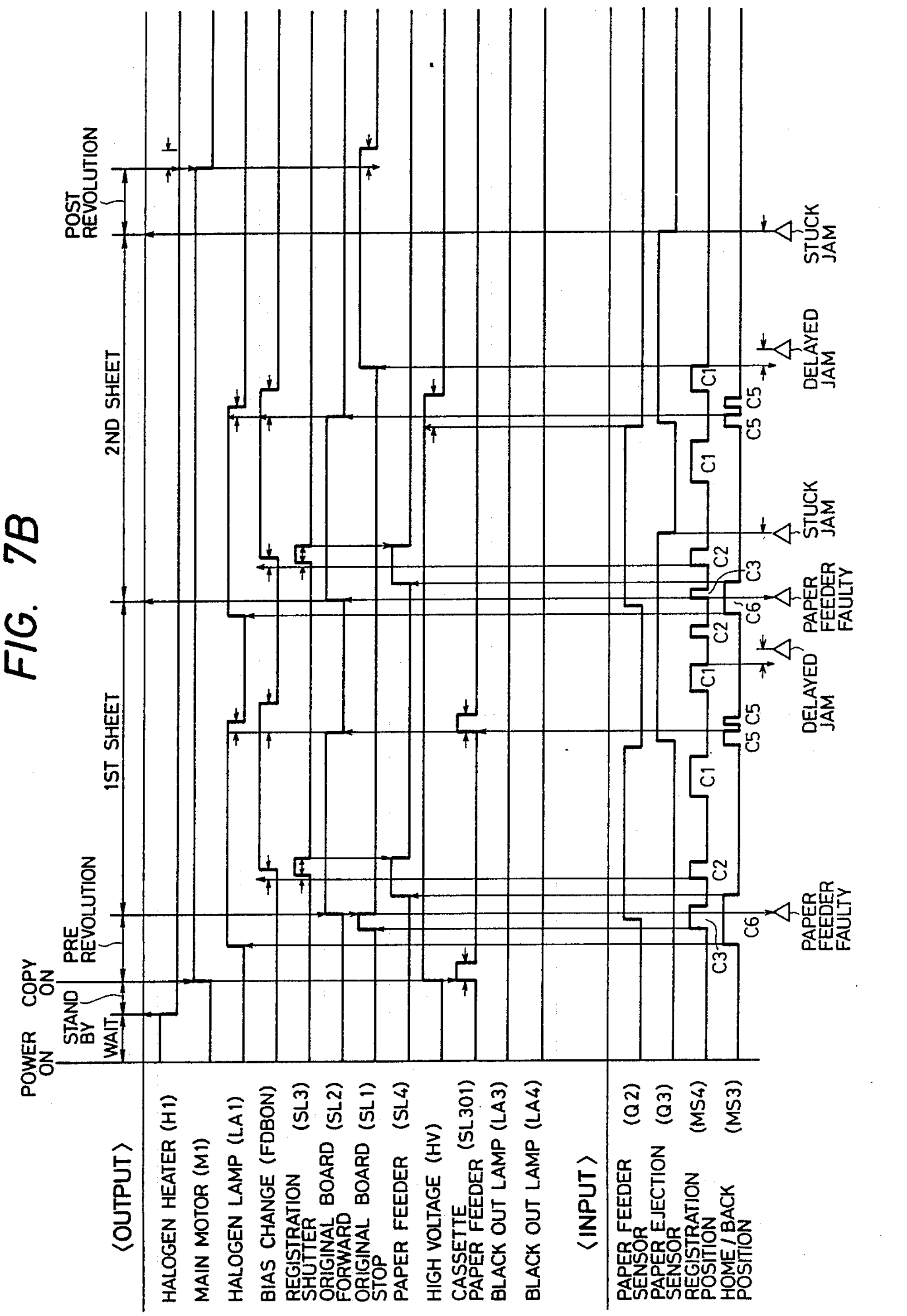
FIG. 7B is a timing chart showing the operation timings at each section in the equal size mode.

FIG. 7A shows an operational state of the cams and microswitches at the equal size mode, and FIG. 7B shows a timing chart at the equal size mode.

As shown in (a) of FIG. 7A, the original board 1 starts moving backward in the arrow R direction. Then, the cam switch C1 and the microswitch MS4 become separate from each other to render the microswitch MS4 turn off from its turn-on state. As a result, every time after completion of copying a single sheet of recording paper, an output delayed jam check for detecting whether a delay jam has been generated at the output or not, is executed, and further an output stop jam check for detecting whether a stop jam has been generated at the output or not is started. And at the end of the copying, the solenoid SL1 is turned on to stop the original board 1.

Next, as shown in (b), the halogen lamp LA1 is turned on when the microswitch MS3 is turned on. And when the microswitch MS4 is also turned on, the solenoid SL1 is turned on. In the case the cassette 4 is used for feeding paper, a paper feeder faulty check is performed.

Further, as shown in (c), as the original board 1 advances in the arrow F direction and the microswitch MS3 turns on from its off state, the manual paper feeder solenoid SL4 is turned on.

Next, as shown in (d), as the microswitch MS4 turns on from its off state, then the registration shutter solenoid SL3 is turned on after a certain time delay therefrom, and a timer which determines an on time of the registration shutter solenoid SL3 is actuated. Succeedingly, the bias for the development is changed within a preset time so as to obtain an image corresponding in density to the value indicated by the copy intensity lever 47. In response to the time up of the timer, the resist shutter solenoid SL3 is turned off, and the manual paper feeder solenoid SL4 is turned off.

Next, as shown in (e), no operation is carried out under the state in which the microswitch MS4 turns on from its off state.

Next, as shown in (f), as the microswitch MS3 turns off from its on state, the original board advance solenoid SL2 is turned off to initiate a reverse control of the direction of movement. After a certain time lapse therefrom, the halogen lamp LA1 is turned off, and in the case that a plurality of copies for the same original is required (continuous copying), the cassette paper feeder solenoid SL301 is turned on in order to enable to perform the second and following copying operations. In addition, a development bias changing timer is actuated, and in response to the time-up of the timer, the image bias is changed over to a non-image bias. In (g) and (h), the conditions wherein no operations are performed in the equal size mode are shown. A continuous copying is carried out by repeating the processes beginning with (a) above.

The timing chart showing these operation timings at each section in the equal size mode is in FIG. 7B.

Next, in FIG. 8A, an operational state of the cams and microswitches at a reduction mode is shown.

As shown in (a) of FIG. 8A, the original board 1 starts moving backward in the arrow R direction. Then, the cam switch C1 and the microswitch MS4 become separate from each other to render the microswitch MS4 turn off from its turn-on state. As a result, every time after completion of copying a single sheet of recording paper, an output delayed jam check for detecting whether a delayed jam has been generated at the output or not is executed, and further an output stop jam check for detecting whether a stop jam has been generated at the output or not is started. And at the end of the copying, the solenoid SL1 is turned on to stop the original board 1.

Next, as shown in (b), the halogen lamp LA1 is turned on when the microswitch MS3 is turned on. And when the microswitch MS4 is also turned on, the solenoid SL1 is turned on. In the case the cassette 14 is used for feeding paper, a paper feeder faulty check is performed.

Further, as shown in (c), as the original board 1 advances in the arrow F direction and the microswitch MS3 turns on from its off state, the manual paper feeder solenoid SL4 is turned on.

Next, as shown in (d), as the microswitch MS4 turns on from its off state, then the registration shutter solenoid SL3 is turned on after a certain time delay thereafter, and a timer which determines an on time of the registration shutter solenoid SL3 is actuated. Succeedingly, the bias for the development is changed within a preset time so as to obtain an image corresponding in density to the value indicated by a copy intensity lever 4. In response to the time-up of the timer, the registration shutter solenoid SL3 is turned off, and the manual paper feeder solenoid SL4 is turned off.

Next, as shown in (e), no operation is carried out under the state in which the microswitch MS4 turns on from its off state.

Next, as shown in (f), as the microswitch MS3 turns on from its off state, the original board advance solenoid SL2 is turned off to initiate a reverse control of the direction of movement. In addition, a development bias changing timer is actuated, and in response to the time-up of the timer, the image bias is changed over to a non-image bias.

Next, as shown in (g), when the microswitch MS3 turns off from its on state, the halogen lamp LA1 is turned off. In the case that a continuous copying is required, the cassette paper feeding solenoid SL301 is turned on in order to enable to copy the second and following copying operation. In (h), no operation is carried out. A continuous copying is carried out by repeating the processes beginning with (a).

Figure 8B:
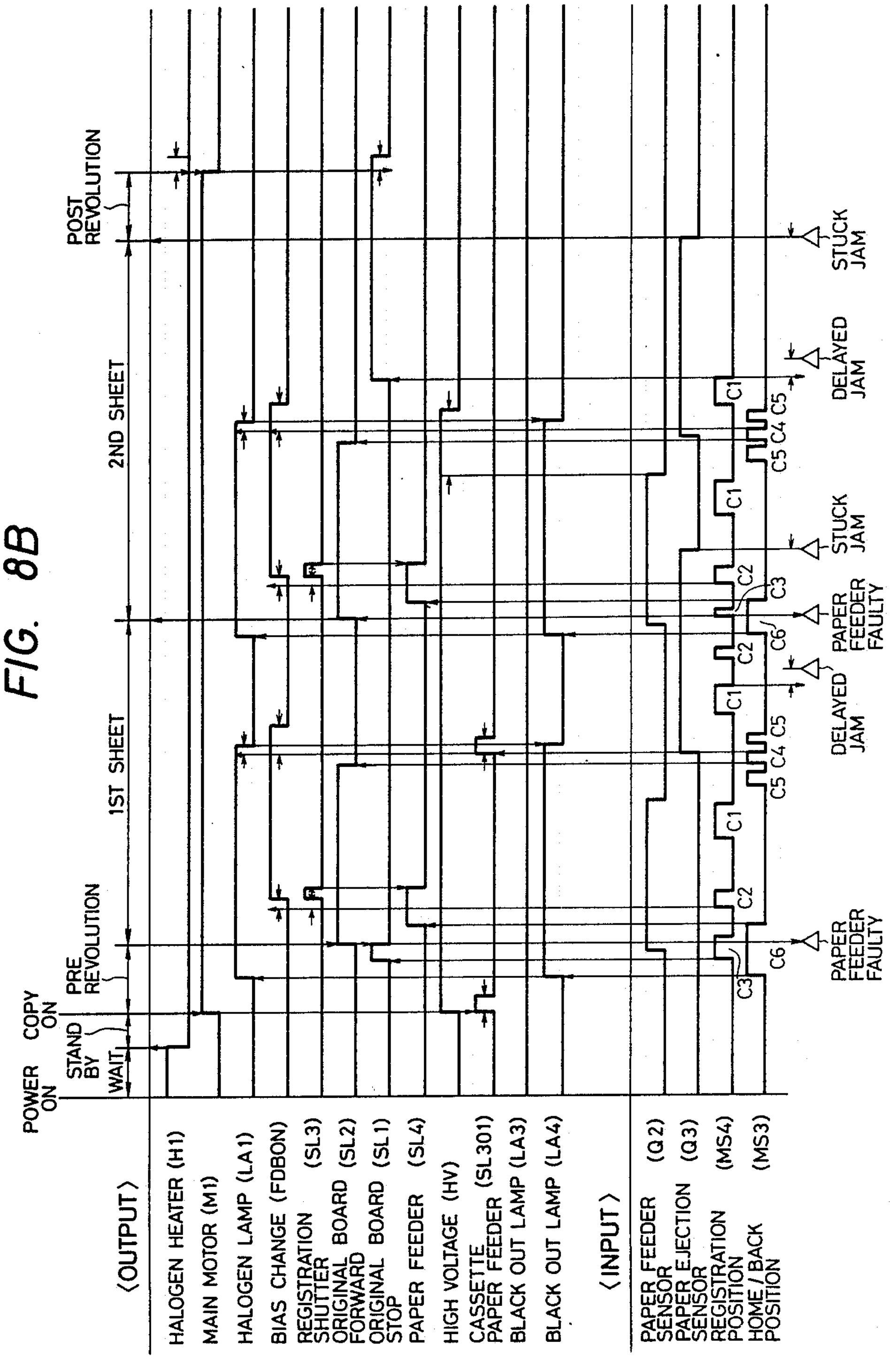
FIG. 8B is a timing chart showing the operation timings at each section in the reduction mode 1.
Figure 8C:
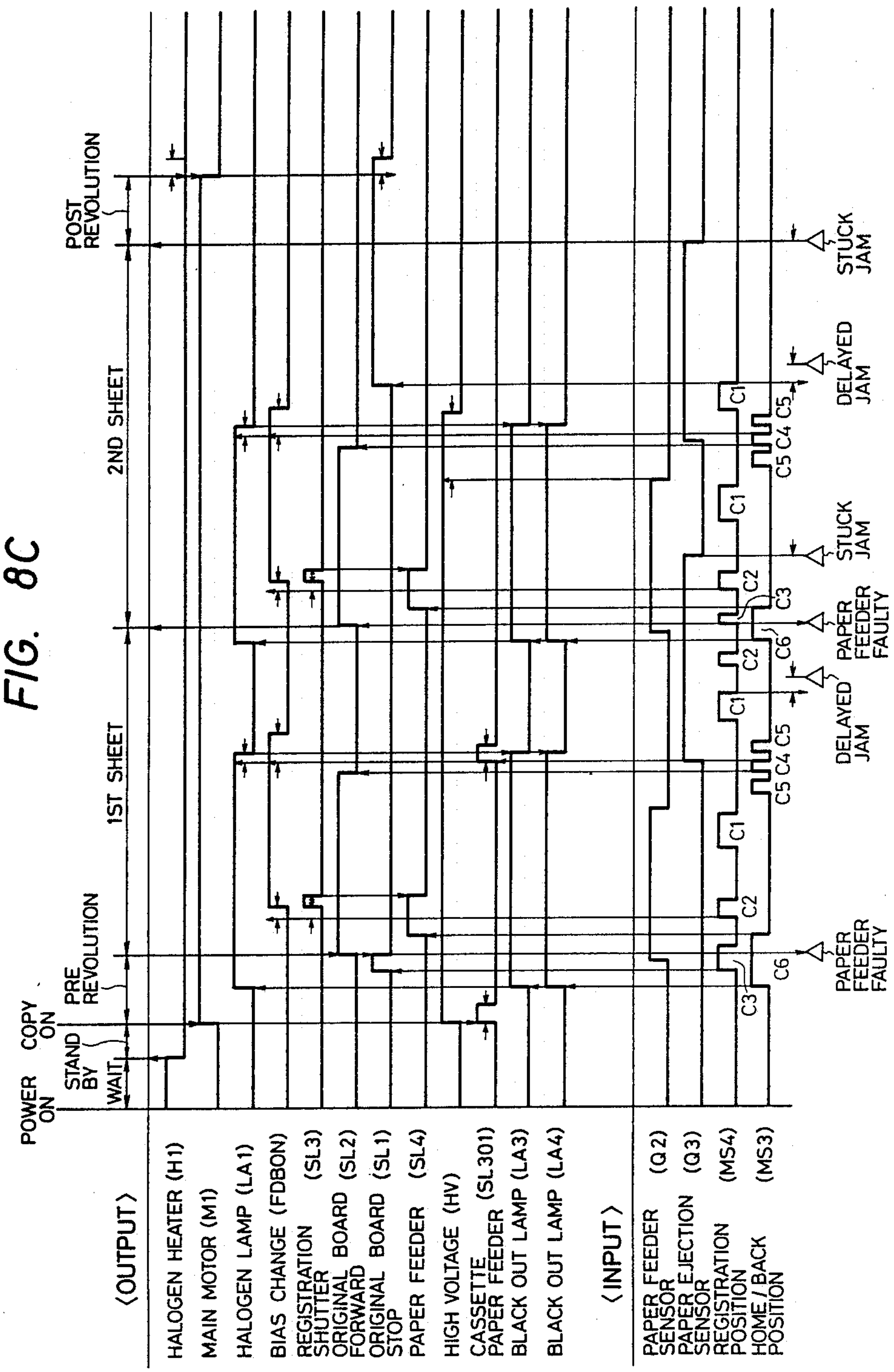
FIG. 8C is a timing chart showing the operation timings at each section in the reduction mode 2.

The timing charts showing these operation timings at each section in the reduction mode 1 and 2, respectively are shown in FIGS. 8B and 8C.

The copying machine according to the present embodiment has the reduction modes 1 and 2, and in both modes a copying sequence shown in FIG. 8A is carried out. In (d) of FIG. 8A, a time period (registration timing) from the time instant when the microswitch MS4 turns on from its off state to the time instant when the registration shutter solenoid SL3 turns on, varies with the advance speed of the original board 1. Further, as shown in Table 1, the illuminating states of the black-out lamps differ in both modes.

Figure 9:
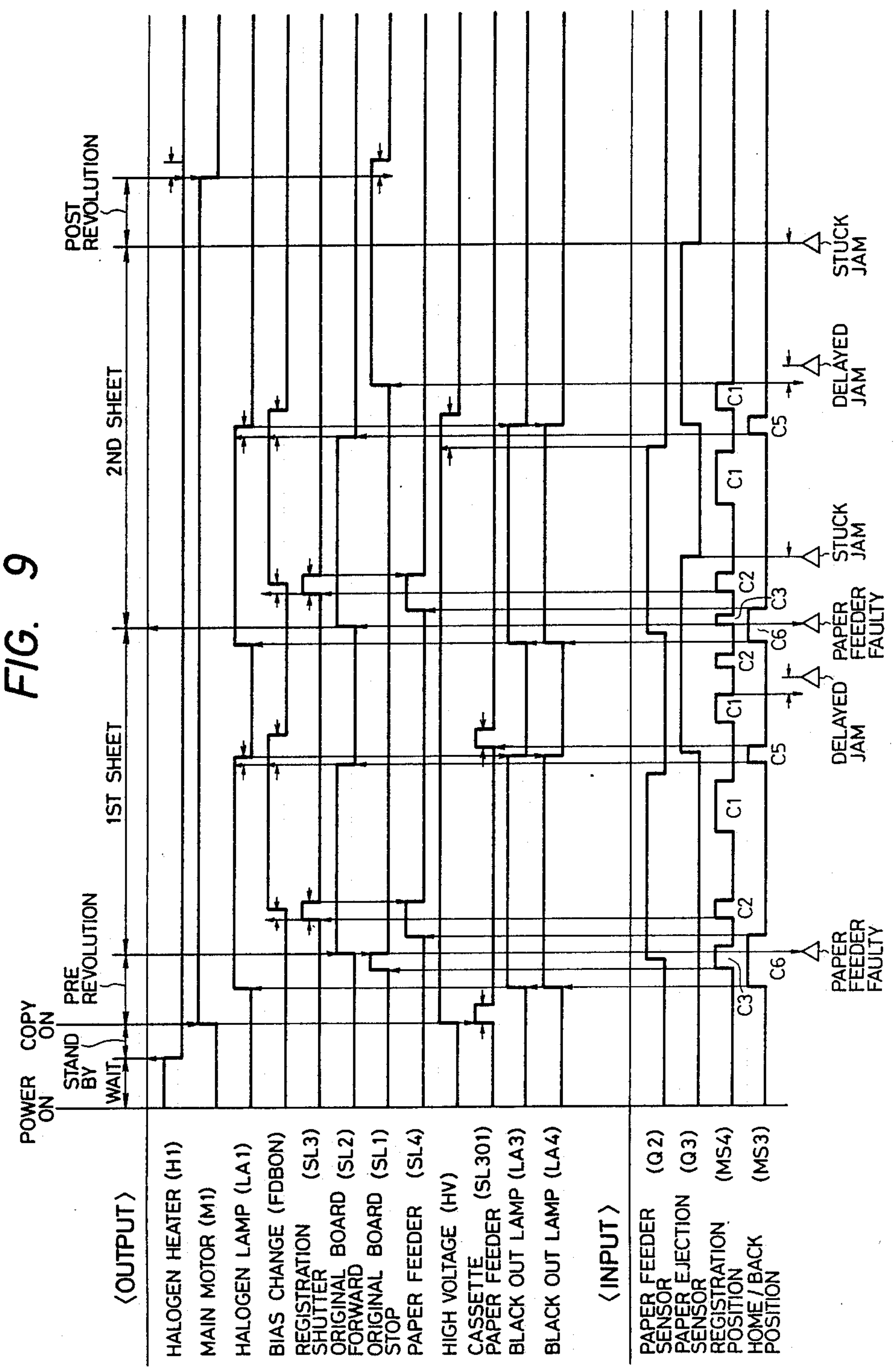
FIG. 9 is a timing chart showing the operation timings at each section in a B5 block mode.

Next, in the B5 block, the CPU Q203 reads as shown in Table 2 the same signal as that in the magnification mode, and starts a copying sequence shown in FIG. 6A. The position of the lens 2 and the speed of the original board 1, however, are mechanically set, and are the same as those in the equal size mode. The black-out lamps LA3 and LA4 illuminate similarly in the reduction 2 mode, as shown in Table 1, and the photosensitive drum 3 is restricted within an image area up to the B5 size. FIG. 9 shows a timing chart at each section in such a B5 size mode.

In the single size change mode, as shown in Table 2, the CPU Q203 reads the same signal as that in the reduction mode 1, and starts the same copying sequence as in FIG. 8A. The position of the lens 2 is mechanically set as identical to that in the equal size mode, and the speed of the original board 1 is as identical to that in the reduction 2 mode. As a result, a copied image can be obtained which has only in the paper transporting direction the same reduction ratio as that of the reduction 2 mode.

This means that if the copied image in the single size change mode is directly transferred onto a formal size recording paper, the image on the recording paper is positioned on one side portion thereof. Therefore, the registration timing is set earlier than usual so that the image can be positioned centrally of the recording paper. In the present embodiment, the difference of the copying sequences the CPU Q203 performs in the reduction modes 1 and 2 resides in the setting time of the registration timing. Thus, by reading the registration timing for the reduction mode 1 instead of that for the reduction mode 2, the image can be positioned centrally of the recording paper.

Figure 10:
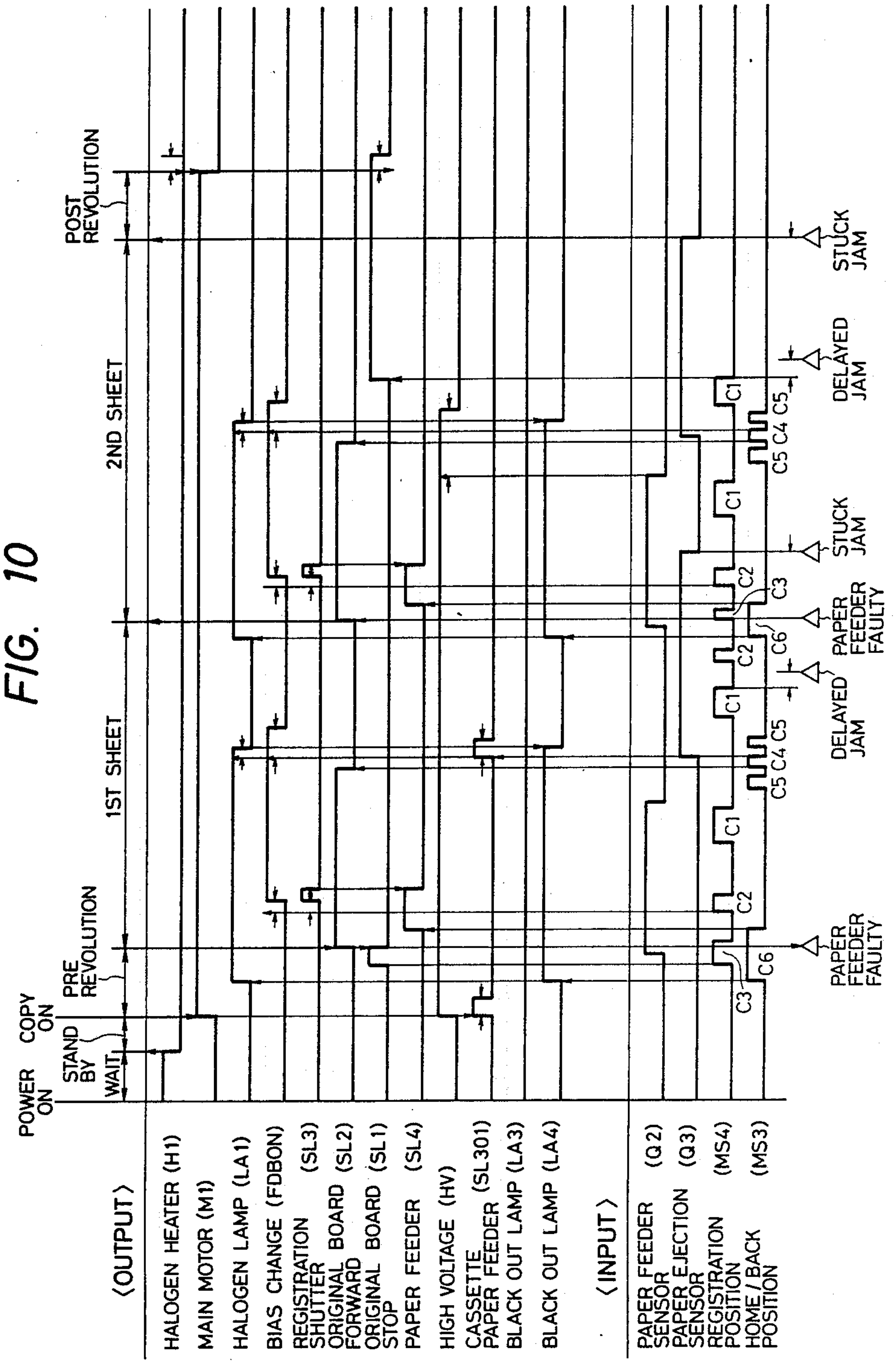
FIG. 10 is a timing chart showing the operation timings at each section in a single size change mode.

In the present embodiment, a compensation lens for the zoom lens 2 is provided for use in the single size change mode, and the image area on the photosensitive drum 3 is made identical with that in the reduction mode 1 not with that in the equal size mode, with only the black-out lamp LA4 being illuminated. The operation states at each section in the single size change mode is shown in the timing chart of FIG. 10.

In the copying sequence according to the present embodiment, the halogen lamp LA1 repeats to turn on and turn off every time copying a single sheet is performed. However, there is a fear of continuous illumination of the halogen lamp LA1 in case abnormalities are brought about on an illumination signal or on an illumination control element. The continuous illumination of the halogen lamp LA1 causes due to its heat generation an extraordinary temperature rise of the original board 1. Although the halogen lamp LA1 has a temperature switch which makes the lamp turn off when the ambient temperature exceeds over a certain limit, there still remains a fear of an abnormal temperature rise during such continuous illumination. Therefore, a protective circuit is provided which makes the halogen lamp LA1 turn off if it continues to illuminate over a preset time period, thus preventing in advance a temperature rise of the original board 1.

Figure 11:
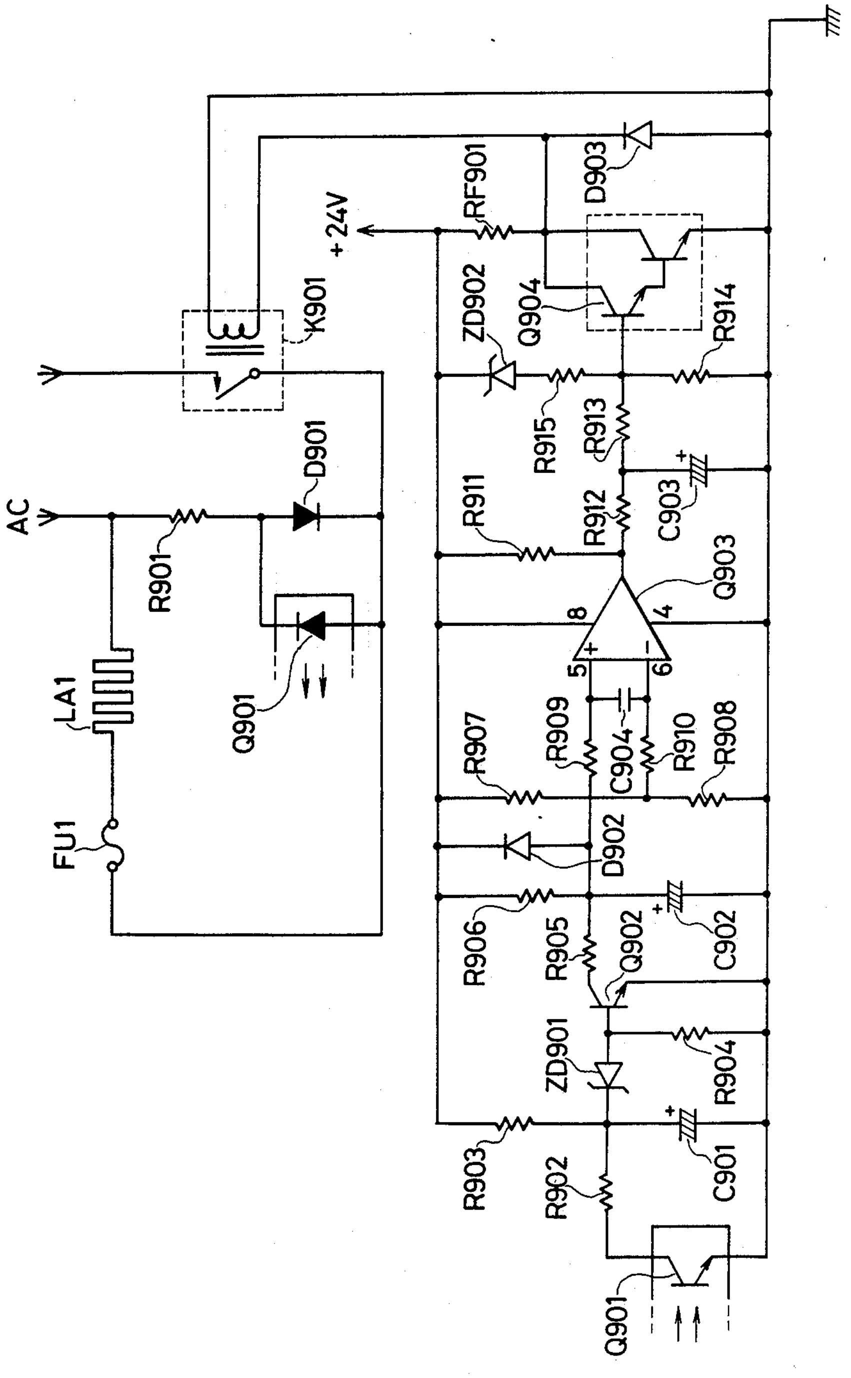
FIG. 11 is a circuit diagram showing an example of a structure of a protective device for an original manuscript exposure lamp.

FIG. 11 shows one example of such a protective circuit. In the figure, reference R901 to R914 denote resistors, reference D901 to D903 denote diodes, reference ZD901 and 902 denote zener diodes, reference C901 to C903 denote capacitors, reference Q901 denotes a photocoupler, reference Q902 denotes a switching transistor, reference Q903 denotes a comparator, and reference Q904 denotes a transistor for controlling a relay K901.

In the circuit, the time period while the halogen lamp LA1 is illuminated with an AC voltage applied to both end terminals thereof, is detected by the photocoupler Q901 and the transistor Q902. The time period under illumination is converted into voltage with the help of the resistor R906 and the capacitor C902. The converted voltage is compared by the comparator Q903 with a preset voltage set by the resistor R907 and the resistor R908. And when the halogen lamp LA1 continues to illuminate over the preset time period, the transistor Q904 drives the relay K901 to terminate the supply voltage to the halogen lamp LA1.

In the circuit shown in FIG. 11, the illumination is recognized from the voltage applied between the photocoupler Q901 serving as an illumination detection member. As a result, even if the lamp does not actually illuminate, for example, in the case that the wire of the halogen lamp LA1 is broken out, the detection results consider it as the lamp still illuminates. In addition, since the time/voltage conversion is effected basing upon a time constant determined by the resistor R906 and the capacitor C902, it may lead to a large error.

Figure 12:
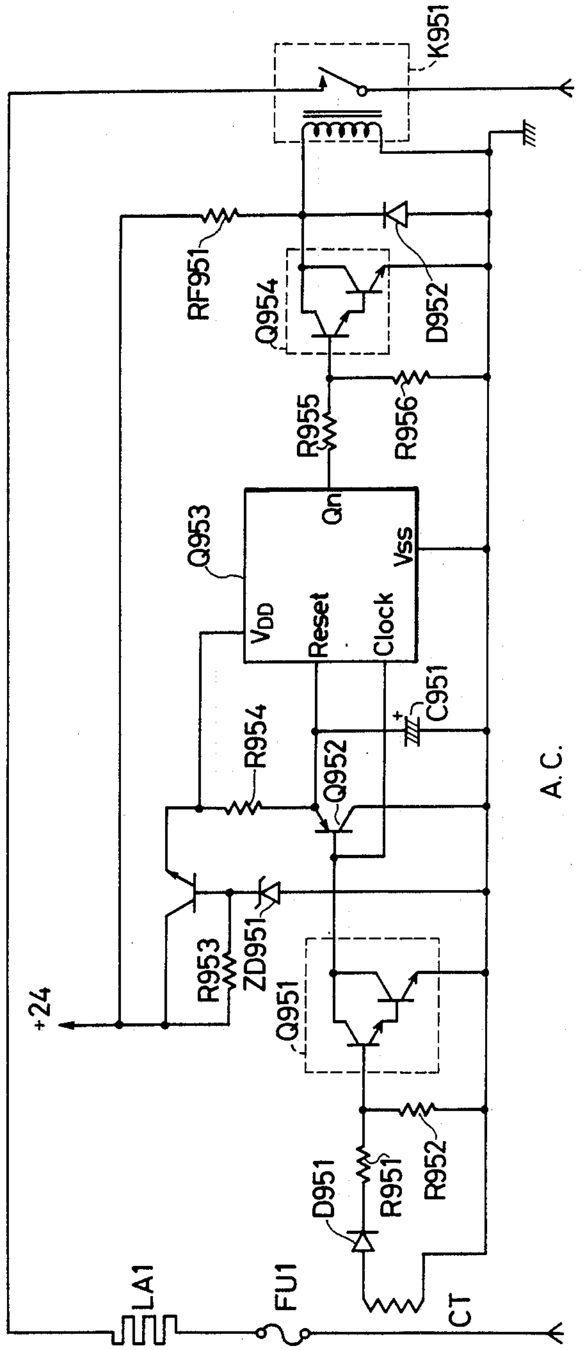
FIG. 12 is a circuit diagram showing an example of a structure of a protective device for an original manuscript exposure lamp, according to the present invention.

In consideration of the above fact, the present invention provides a protective circuit shown in FIG. 12.

In FIG. 12, reference CT denotes a current transformer, references R951 to R956 denote resistors, references D951 to D952 denote diodes, reference ZD951 denotes a zener diode, reference Q951 denotes a transistor, reference Q952 denotes a transistor serving as an illumination detection member, reference Q953 denotes a frequency divider, and reference Q954 denotes a transistor controlling a relay K954.

In the circuit, the illumination of the halogen lamp LA1 is detected by a current flowing through the halogen lamp LA1 by using the current transformer CT. The illumination detection member generates pulses corresponding to the power-frequency of the current, that is 50 Hz or 60 Hz. The pulses are in turn counted with the frequency divider Q953 to thereby set a correct time period. And if the halogen lamp LA1 continues to illuminate over a predetermined time period, the transistor Q954 drives the relay K901 to turn off the halogen lamp LA1. The reset of the frequency divider Q953 for each turning off of the halogen lamp LA1 is performed by preventing pulses from being delivered during a coarse time period defined by the capacitor C951 and the resistor R954.

As appreciated, the protective circuit shown in FIG. 12 can dispense with a precise oscillator required for the circuit of FIG. 11, and is simple in construction and moreover has an extensively high reliability.

Figure 13:
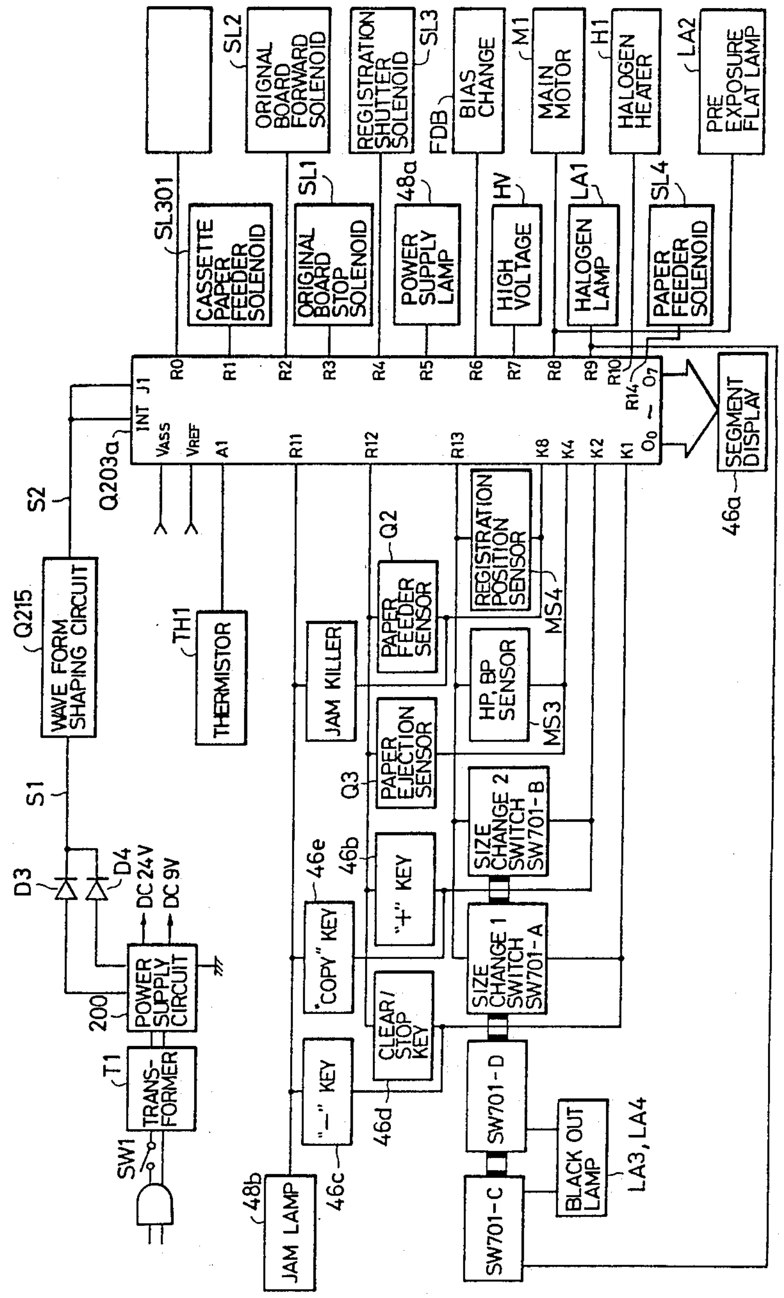
FIG. 13 is a block diagram showing one example of a structure of a control section of the copying machine shown in FIGS. 1 and 2.

FIG. 13 is a block diagram of a control circuit of the copying machine shown in FIG. 1. In the figure, reference Q203 denotes a CPU, e.g., a microcomputer containing an 8 bit A/D converter, such as TMS2600 of Texas Instruments Incorporated. It is also possible to use an A/D converter provided externally of the CPU Q203.

Power sources for the copying machine are an AC power source, DC 24V power source, and DC 9V power source. The AC power source is supplied to a power source circuit 200 through a transformer T1 for generating 24V and 9V DC power sources. The AC power source is mainly used for a main motor M1, the halogen lamp LA1, a halogen heater H1, and the like. The DC 24V power source is used for a plunger and the like, and the DC 9V power source is used for the CPU Q203 and the like.

The CPU Q203 is reset to initialize via INIT terminal (not shown) when a power i supplied upon closing the main switch SW1. That is, a control program starts.

Figure 14A:
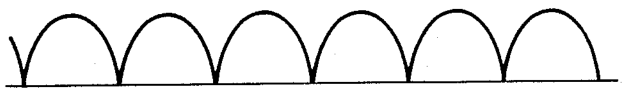
FIGS. 14A and 14B show waveforms in the control section of FIG. 13, respectively of a signal obtained by full-wave rectifying an alternate current waveform of an AC power source, and of a pulse signal whose high level corresponds to a zero-crossing point of the full-wave rectified signal.
Figure 14B:

As shown in FIG. 14A, a signal S1 full-wave rectified by the diodes D3 and D4 is converted into a signal shown in FIG. 14B by means of a waveform shaping circuit Q215. Thus, a zero cross pulse S2 of the kind which becomes high level near a zero cross point of the AC waveform of the AC power source, is input to INT and J1 terminals.

While the CPU Q203 is interrupt-enabled, the CPU starts to execute the interrupt program at the rising edge of a zero cross pulse input to the INT terminal. The CPU Q203 further distinguishes between 50 and 60 Hz, under control of an internal program and by counting the number of zero cross pulses input from the J1 terminal during a preset time period.

The operator can recognize, from the illumination of a power lamp 48*a* and the display "1" on the segment display 46*a*, the start of the copying sequence by the CPU Q203.

At the initial rest, the CPU Q203 starts to operate an internal first timer, and detects the high level of the signal input at the J1 terminal. Unless the high level is detected, the following step is not proceeded. Moreover, unless the high level is detected by the time when the first timer completed its counting, it is decided that the machine is abnormal.

Figure 15:
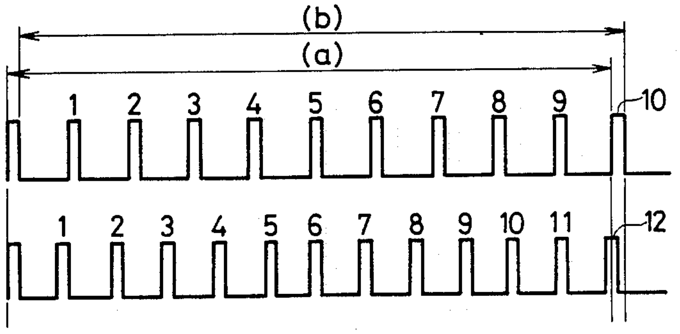
FIG. 15 has views for illustrating counting states for counting the number of pulse signals, respectively corresponding to 50 Hz and 60 Hz.

At the time when the high level of the signal input to the J1 terminal is detected, a timer for detecting 50 or 60 Hz is actuated. The timer in the present embodiment is 100 ms, and as shown in FIGS. 15A and 15B, upon actuation at the time instant when the high level is detected, the timer starts and continues to count zero cross pulses during (a) or (b). In the case of 50 Hz shown in FIG. 15A, during the time of 100 ms the maximum count value is 10 without counting the first high level. In the case of 60 Hz shown in FIG. 15B, during the time of 100 ms the maximum count value is 11 without counting the first high level similarly to the 50 Hz case. It is possible therefore to distinguish between 50 and 60 Hz of the power frequency by determining that the case whose count value is smaller than 10 stands for 50 Hz and that the case whose count value is larger than 10 stands for 60 Hz.

Referring back to FIG. 13, references K1, K2, K4, and K8 are input ports. Sensors, input keys, and the like are connected to the input ports and also to output ports R11 to R13.

Figures 16, 17:
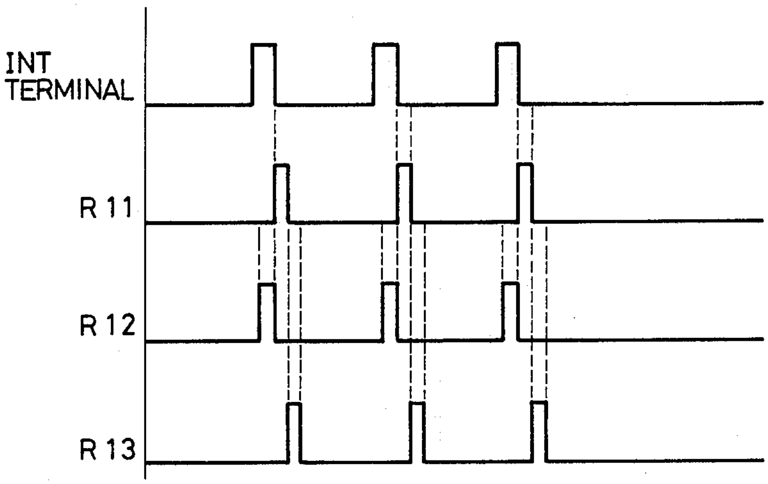

FIG. 16 shows connections between these ports, and the sensors, input keys, and the like. More in particular, the input port K1 is connected to a minus key 46*c*, clear/stop key 46*d*, and size change 1 switch SW701-A, the input port K2 is connected to a copy key 46*e*, plus key 46*b*, and size change 2 switch SW701-B, the input port K4 is connected to a paper ejection sensor Q3 and home position back position (HP.BP) sensor (microswitch) MS3, and the input port K8 is connected to a jam killer, paper feeder sensor Q2, and registration position sensor (microswitch) MS4.

FIG. 17 shows pulse output timings at the output ports R11 to R13. When the interrupt program starts upon detection of the rising edge of the input pulse at the INT terminal, a pulse signal is output from the output ports R11, R12, and R13 at a predetermined timing in the interrupt program without overlapping. At this time instant, the CPU Q203 stores the information supplied to the input ports K1 to K8 and reads the input state. The output port 11 delivers a pulse oscillation of 100 to 200 μsec serving as a dynamic scanning signal for a matrix during an ordinary operation. And in an abnormal operation such as jam or the like, it delivers a static signal or a pulse oscillation of 0.6 sec on/0.6 sec off. In the normal operation with 100 to 200 μs pulse oscillation, a capacitor (not shown) connected to the output port R11 absorbs the pulse oscillation, and keeps the jam display 48*b* not illuminated.

Figure 18:
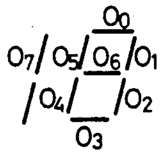

FIG. 18 shows connections of the output ports R0 to R11, R14, 00 to 07, in the control circuit shown in FIG. 13. As shown in the figure, the output ports R0 to R11, R14, 00 to 07 of the CPU Q203 are separately connected in order to independently control respective stages. More in particular, the output port R0 is not commonly used, the output port R1 is connected to the cassette paper feeder solenoid SL301, the output port R2 is to the original board advance solenoid SL2, the output port R3 is to the original board stop solenoid SL1, the output port R4 is to the registration shutter solenoid SL3, the output port R5 is to the power source lamp 48*a*, the output port R6 is to a bias circuit enabling to adjust the intensity of the image by the intensity adjustment lever 47, the output port R7 is to a high voltage circuit HV, the output port R8 is to the main motor M1 driving the photosensitive drum and the like and a pre-exposure lamp LA2, the output port R9 is to the halogen lamp LA1, the output port R10 is to the halogen heater H1, the output port R11 is to the paper feeder solenoid SL4, and the output port R11 is connected to the jam display 48*b*, respectively. The output ports 00 to 07 are connected to the segment display 46*a*.

The signals from the output ports R7 and R3 are connected to a jack (not shown) to obtain therefrom an OR signal, the OR signal being set so as to become on at the starting time of copying and to become off at the end of the copying. In the case that all papers are used during the continuous copying, the OR signal is set as an on signal due to the presence of the signal from the output port R3. The on signal is used for sorting operation.

Figure 19:
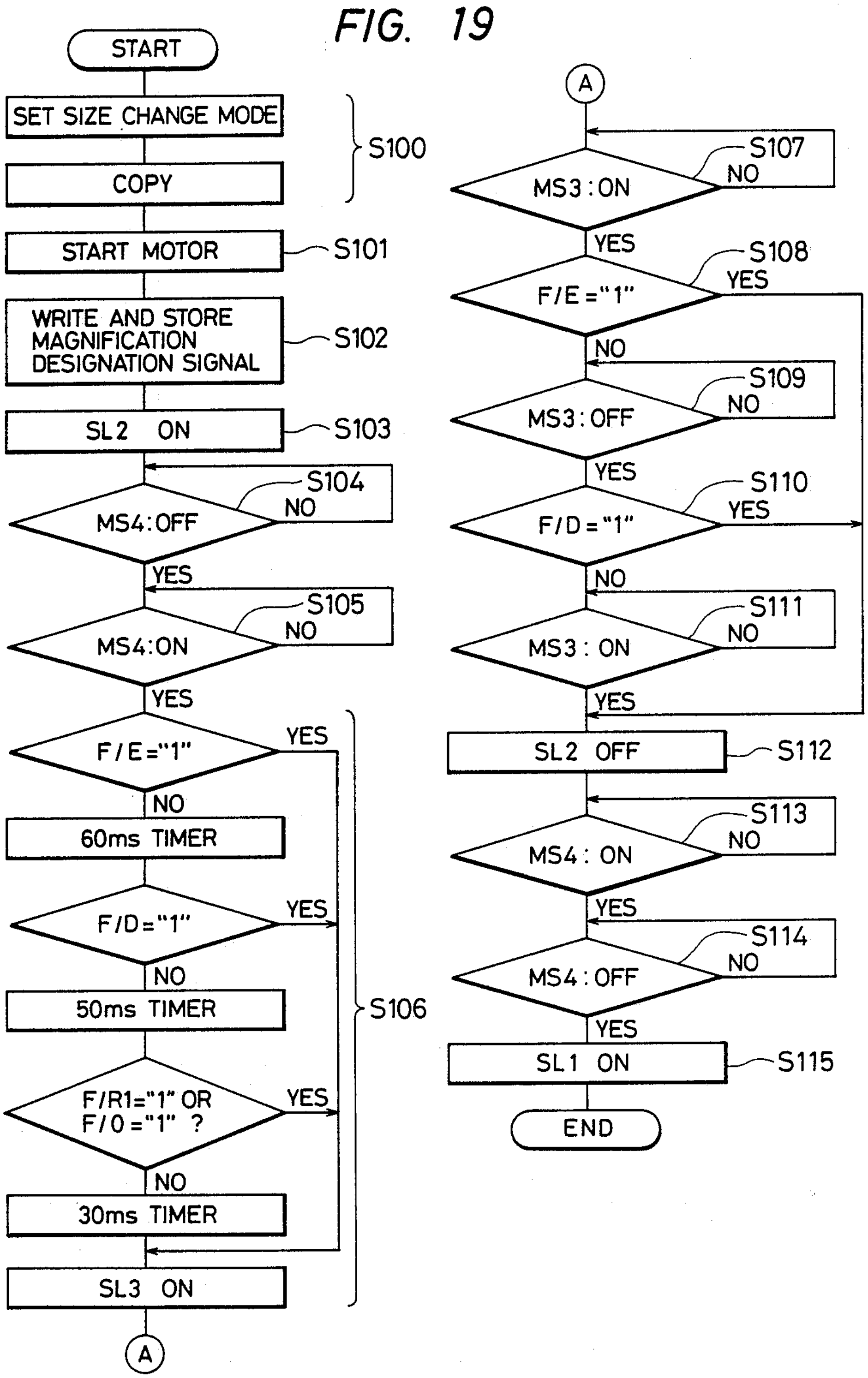

FIG. 19 shows a processing sequence by the CPU Q203 with respect to the movement control of the original board 1 and the registration timing setting and the like in each mode which have been described with FIGS. 6 to 10.

First, at a step S100, a magnification ratio is set by an operator using the size change setting dial 2*a*, and upon depression of the copy key 46*a*, the motor rotates at a step S101 to move the original board 1. The moving speed of the original board 1 and the position of the lens 2 is mechanically locked in accordance with the magnification ratio, and the original board 1 is positioned at a start position.

At the step S102, a magnification signal is read from the rotary switches SW701-A and SW701-B at a time instant just before the original board 1 is moved forward, and the magnification ratio as shown in Table 2 is recognized. If either the magnification mode or the B5 mode is employed, a flag F/E indicative of such state is set as "1", if the same size mode is employed, a flag F/D indicative of such state is set as "1", if the reduction 1 mode is employed, a flag F/Rl indicative of such state is set as "1", and if the single size change mode is employed, a flag F/0 indicative of such state is set as "1". In a step S103, the original board advance solenoid SL2 is turned on to initiate the advance of the original board 1.

At a step S104, it is ensured that the microswitch MS4 passes over the start position cam C3. At a step S105, it is ensured that the microswitch MS4 detects the resist position cam C2.

At a step S106, the registration timing at each magnification ratio is determined in accordance with the flag set at the step S102, for example, as shown in the figure, and the registration shutter solenoid SL3 is turned on. At a step S107, the turning on of the microswitch MS3 by the original board reverse cam C5 is detected. At a step S108, if the present status is judged as the magnification mode or the B5 mode, then a step S112 follows wherein the original board advance solenoid SL2 is turned off to start to move backward.

If the present status is not the magnification mode or the B5 mode, a step S109 follows. After the microswitch MS3 turns off with the original board reverse cam C5 passing over the microswitch MS3, then at a step S110, if the present status is judged as the equal size mode, a step S112 follows to move the original board backward.

At the step S110, if the present status is judged as not the equal size mode, that is, if the present status is the reduction 1 mode, reduction 2 mode, or single size change mode, a step S111 follows. At the time instant when the microswitch MS3 is turned off by the reverse cam C4, the step S112 follows.

Succeedingly, at a step S113, the microswitch MS4 detects the stop position cam C1, and at a step S114, the cam C1 continues to pass on the microswitch MS3 until the former passes over the latter. At this time instant, a step S115 follows to make the original board stop solenoid SL1 turn on to thereby stop the original board 1, and the copying operation is terminated.

As described above, the flag F/0 for use in the single size change mode is provided. The flag is set at the step S102, and the timing for use in the single size change mode is set at the step S106. Thus, paper feeding is carried out with a reduction ratio in the single size change mode, that is, with a different timing from that in the reduction 2 mode, so that the image can be positioned centrally of the recording paper in the single size change mode.

In other words, according to the embodiment, in the single size mode, it is possible to set a registration timing 60 ms+50 ms=110 ms identical with that in the reduction 1 mode at the step S106.

Next, a second embodiment according to the present invention will be described. It is noted that the copying machine described with reference to FIGS. 1, 2, 4, and 5 may also be applied. Therefore, in the second embodiment, similar elements corresponding to those shown in the first embodiment have been represented by identical references used in the first embodiment, and the duplicating description has been omitted.

In the copying machine according to the embodiment, it is assumed that the following respective modes can be selectively set.

(1) equal size mode: copying the same size one as the original and capable of copying at the maximum up to an A4 modified (letter) size original.

(2) magnification mode: copying by magnifying the size of the original.

(3) reduction 1 mode: copying by reducing the size of a recording image of the original image by a ratio of 1:0.786 and capable of copying a B4 size original at the maximum onto a A4 recording paper.

(4) reduction 2 mode: copying by reducing the size of a recording image of the original by a ratio of 1:0.667.

(5) B5 block mode: copying by removing a black portion other than that corresponding to the original image, which portion is generated in the case, for example, copying a book or the like whose size is of a B5 when opened, onto a recording paper of an A4 size.

(6) single size change mode: copying by reducing only in the scanning direction of the original image.

Thus, among the change size modes, if a reduction mode is set in which the width of an image area relative to the advancing direction is smaller than the A4 size (or a letter size), the black-out lamps LA3 and LA4 are turned on while the original board 1 moves forward during the formation of the electrostatic image, thus preventing an additional toner depositing on a non-image area.

Figures 20, 23:
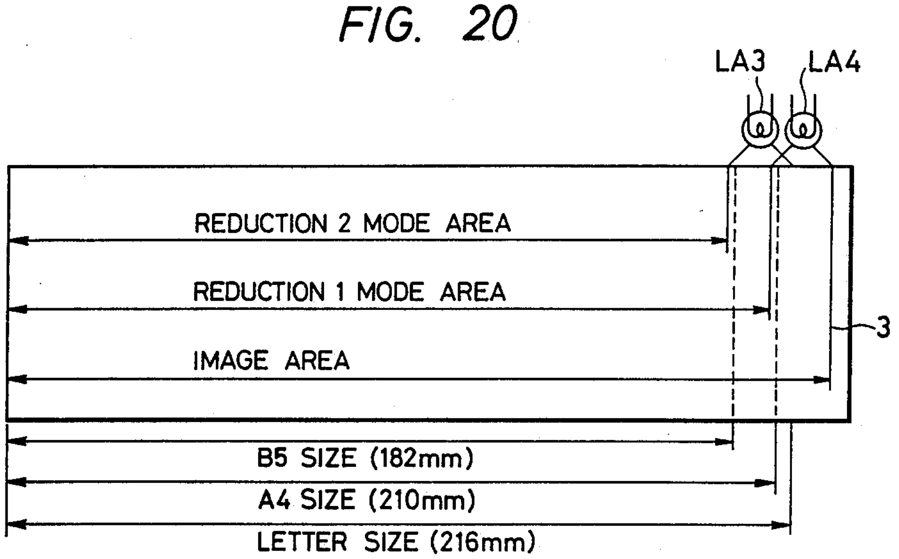

FIG. 20 shows a relation between the positions of the black-out lamps LA3 and LA4, and the image area on the photosensitive drum 3. In addition, in Table 3, the states of the black-out lamps LA3 and LA4 relative to the particular modes are shown.

TABLE 3

| MAGNIFICATION | BLACK LAMP LA3 | BLACK LAMP LA4 |
|---|---|---|
| SAME SIZE MODE | OFF | OFF |
| MAGNIFICATION MODE | OFF | OFF |
| REDUCTION 1 MODE | OFF | ON |
| REDUCTION 2 MODE | ON | ON |

As shown in Table 3, even if the same A4 or letter size recording paper is used for copying, the illumination state of the black-out lamp LA3 or LA4 differs in correspondence with the selected magnification mode.

Similarly to the first embodiment, in the second embodiment, the lens 2 is mechanically moved upon rotation of the motor M1 in accordance with a magnification mode set by the size change setting dial 2*a*. Further, the original board 1 moves with a speed corresponding to the selected magnification mode by changing over a speed reduction gear (not shown).

Figure 21:
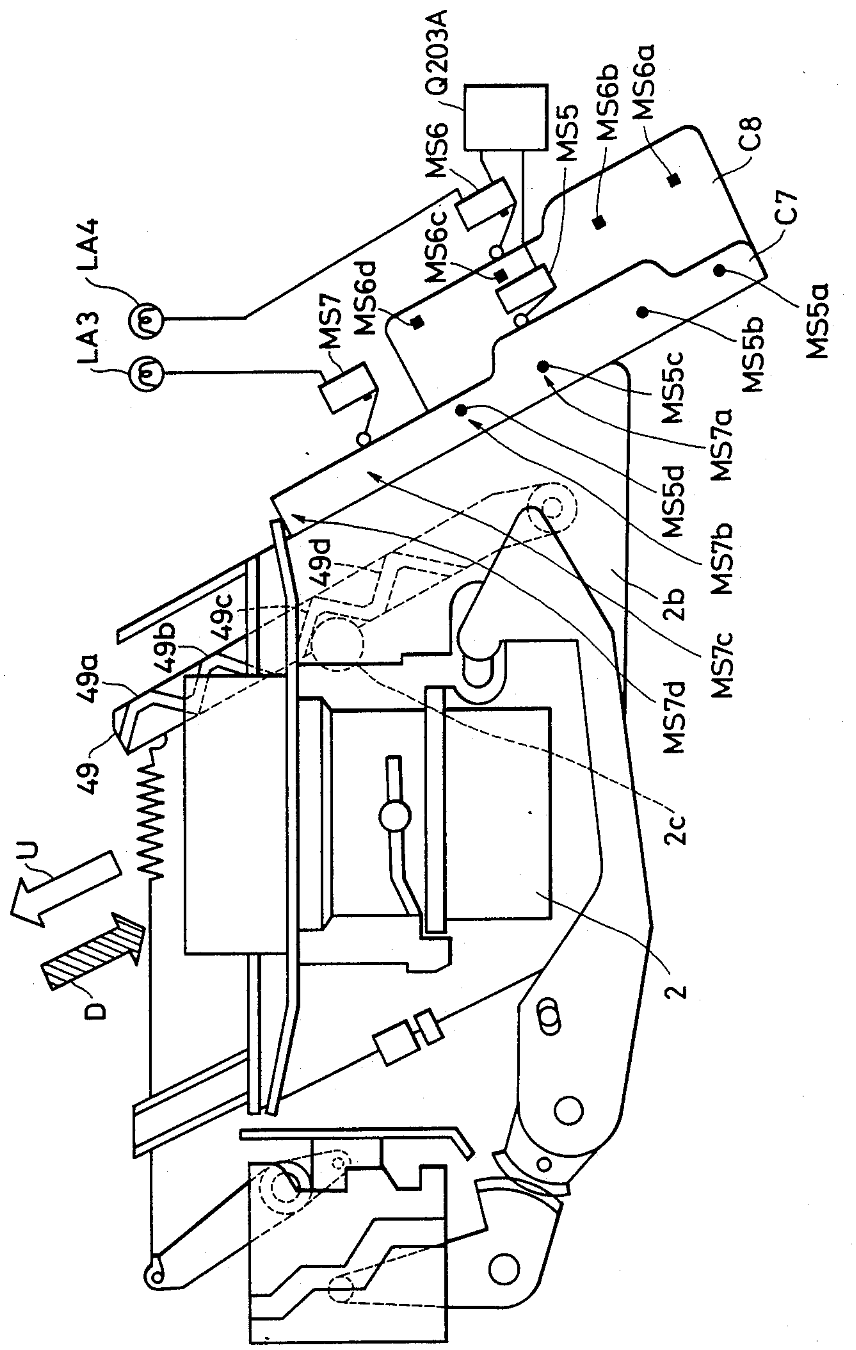
FIG. 21 is a front view showing an example of a structure of a lens position setting section.

FIG. 21 shows a position setting section of the lens 2, wherein reference 2*b* designates a lens base, reference 49 denotes a lens position setting lever, reference 2*c* denotes a position setting pin, references MS5, MS6, and MS7 denote microswitches, and references C7 and C8 denote cams.

The lens 2 moves together with the base 2*b* in the U and D directions as shown in the figure by arrows, and the position is set by the engagement of the lever 49 with the pin 2*c* mounted on the base 2*b*. That is, the lever 49 have portions 49*a*, 49*b*, 49*c*, and 49*d*, respectively corresponding to the reduction 2 mode, reduction 1 mode, equal size mode, and magnification mode. The pin 2*c* is moved to either one of the portions to set the position of the lens 2 in correspondence with the selected magnification ratio.

The position setting of the lens 2 and the speed setting for the original board 1 can be changed in correspondence with each magnification mode, by a not shown cam coupled to the size change setting dial 2*a* and by driving the motor M1. The timing for supplying the recording paper P to the photosensitive drum 3, that is the registration timing, and the scanning area of the original, that is, the reverse position of the original board, are required to be changed with each magnification mode. Therefore, means for setting a magnification mode selected by a CPU Q203a, as described later, is required. Thus, in the present embodiment, the cams C7 and C8 mounted on the lens base 2*b* shown in FIG. 21, and the microswitches MS5 and MS6 connected to the CPU Q203a perform this function to set the magnification mode. Correspondingly, the CPU Q203a executes each processing sequence for a particular magnification mode shown in FIG. 24.

The microswitch MS5 in association with the cam C7 is so disposed as to turn off at a position MS5a on the cam C7 corresponding to the reduction 2 mode and turn on at a position MS5b corresponding to the reduction 1 mode, and to turn off at a position MS56c corresponding to the equal size mode and turn off at a position MS5d corresponding to the magnification mode.

The microswitch MS6 in association with the cam C8 is so disposed as to turn on at a position MS6a on the cam C8 corresponding to the reduction 2 mode and turn on at a position MS6b corresponding to the reduction 1 mode, and to turn off at a position MS6c corresponding to the equal size mode and turn off at a position MS6d corresponding to the magnification mode. The relation between these modes and the states of the microswitches is shown in Table 4.

As to the illumination of the black-out lamps LA3 and LA4 (refer to Table 1), it is possible for the CPU Q203a to effect a control operation basing upon the selected magnification mode, however, it is also possible, as shown in FIG. 21, to control the illumination by directly reading out from the position of the lens 2 with the help of the cams C7 and C8 and the microswitches MS7 and MS6.

The microswitch MS7 associated with the cam C7 is so disposed as to turn on the lamp LA3 at a position MS7a on the cam C7 corresponding to the reduction 2 mode and turn off the lamp LA3 at a position MS7b corresponding to the reduction 1 mode, and to turn off the lamp LA3 at a position MS7c corresponding to the equal size magnification and turn off the lamp LA3 at a position MS7d corresponding to the magnification mode. While on the other hand, the microswitch MS6 is so disposed as to turn on at the positions MS6a and MS6b and to turn off at the positions MS6c and MS6d, as described previously, so that the lamp LA4 may be turned on and off accordingly.

TABLE 4

| MAGNIFICATION | MICROSWITCH MS6 | MICROSWITCH MS7 |
|---|---|---|
| SAME SIZE MODE | ON | OFF |
| MAGNIFICATION MODE | OFF | OFF |
| REDUCTION 1 MODE | ON | ON |
| REDUCTION 2 MODE | OFF | ON |

In the second embodiment, the control for each section is also performed using the microswitches MS3, MS4 and the cams C1, C2, C3, C4, and C5.

The operation conditions of the cams and microswitches and the timing chart in the magnification mode can be referred to FIGS. 6A and 6B, and the description thereof is here omitted.

Similarly, the operation conditions of the cams and microswitches and the timing chart in the equal size mode can be referred to FIGS. 7A and 7B, and those in the reduction 1 and 2 modes can also be referred to FIG. 8A and FIGS. 8B and 8C, respectively, so the description therefor is omitted.

The copying machine according to the present embodiment has the reduction modes 1 and 2, and in both modes a copying sequence shown in FIG. 8A is carried out. In (d) of FIG. 8A, a time period (registration timing) from the time instant when the microswitch MS4 turns on from its off state to the time instant when the registration shutter solenoid SL3 turns on, varies with the advance speed of the original board 1. Further, as shown in Table 3, the illuminating state of the black-out lamps differ in both modes.

Figure 22:
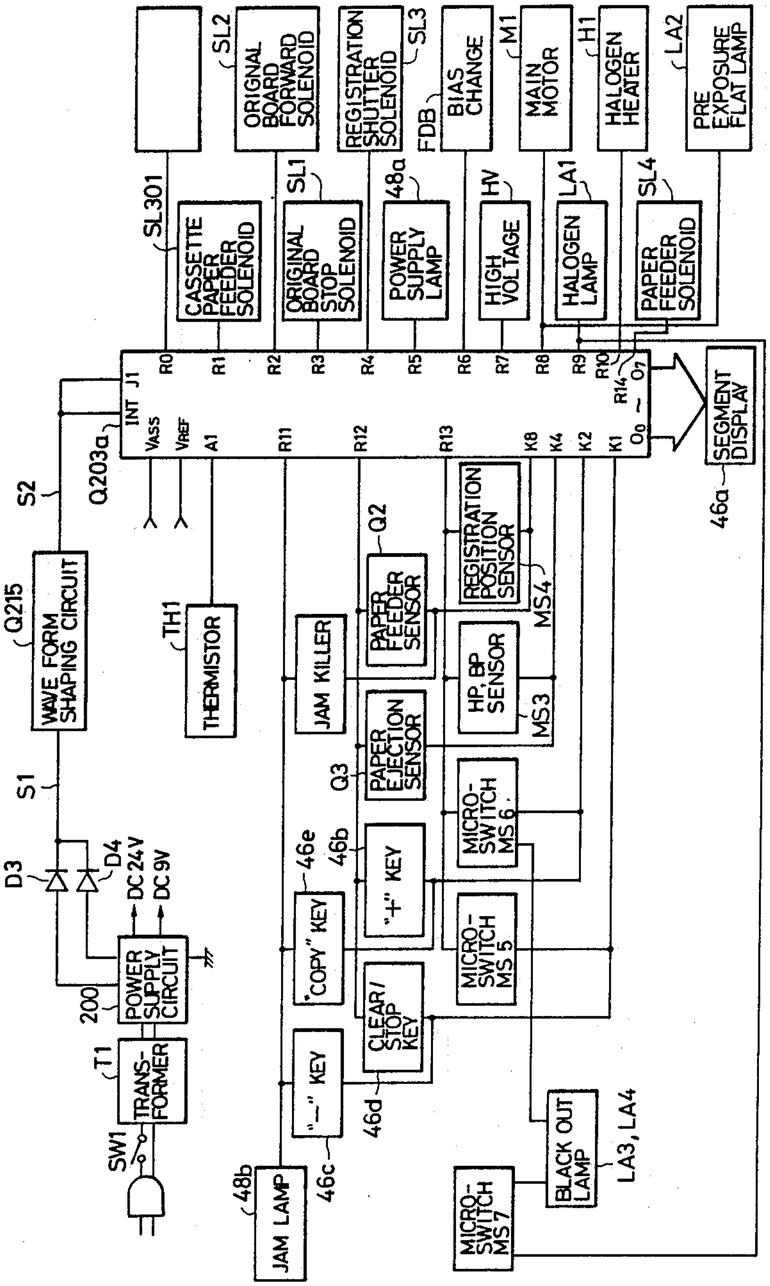
FIG. 22 is a block diagram showing one example of a structure of a control section of a copying machine according to the second embodiment.

FIG. 22 is a block diagram of a control circuit of the copying machine according to the second embodiment, wherein elements having the same functions as in the first embodiment have been represented by identical references. In the figure, reference Q203a denotes a CPU, e.g., a microcomputer containing an 8 bit A/D converter, such as TMS2600 of Texas Instruments Incorporated. It is also possible to use an A/D converter provided externally of the CPU Q203a.

Power sources for the copying machine are an AC power source, DC 24V power source, and DC 9V power source. The AC power source is supplied to a power source circuit 200 through a transformer T1 for generating 24V and 9V DC power sources. The AC power source is mainly used for a main motor M1, the halogen lamp LA1, a halogen heater H1, and the like. The DC 24V power source is used for a plunger and the like, and the DC 9V power source is used for the CPU Q203a and the like.

The CPU Q203a is reset to initialize via INIT terminal (not shown) when a power is supplied upon closing the main switch SW1. That is, a control program starts.

As shown in FIG. 14A and similarly to the first embodiment, a signal S1 full-wave rectified by the diodes D3 and D4 is converted into a signal shown in FIG. 14B through a waveform shaping circuit Q215. Thus, a zero cross pulse S2 of the kind which becomes high level near a zero cross point of the AC waveform of the AC power source, is input to INT and J1 terminals.

While the CPU Q203a is interrupt-enabled, the CPU starts to execute the interrupt program at the rising edge of a zero cross pulse input to the INT terminal. The CPU Q203a further distinguishes between 50 and 60 Hz, under control of an internal program and by counting the number of zero cross pulses input from the J1 terminal during a preset time period. The discrimination method for the power frequency is the same as in the first embodiment, and so the description thereof has been omitted.

The operator can recognize, from the illumination of a power lamp 48*a* and the display "1" on the segment display 46*a*, the start of the copying sequence by the CPU Q203a.

At the initial reset, the CPU Q203 starts to operate an internal first timer, and detects the high level of the signal input at the J1 terminal. Unless the high level is detected, the following step is not proceeded. Moreover, unless the high level is detected by the time when the first timer completed its counting operation, it is judged as abnormal.

Referring back to FIG. 22, references K1, K2, K4, and K8 are input ports. Sensors, input keys, and the like are connected to the input ports and also to output ports R11 to R13.

FIG. 23 shows connections between these ports, and the sensors, input keys, and the like. More in particular, the input port K1 is connected to a minus key 46*c*, clear/stop key 46*d*, and size change 1 switch SW701-A, the input port K2 is connected to a copy key 46*e*, plus key 46*b*, and size change 2 switch SW701-B, the input port K4 is connected to a paper ejection sensor Q3 and home position back position (HP.BP) sensor (microswitch) MS3, and the input port K8 is connected to a jam killer, paper feeder sensor Q2, and registration position sensor (microswitch).

Pulse output timings at the output ports R11 to R13 are shown in FIG. 17 similarly to the first embodiment. When the interrupt program starts upon detection of the rising edge of the input pulse at the INT terminal, a pulse signal is output from the output ports R11, R12, and R13 at a predetermined timing in the interrupt program without overlapping. At this time instant, the CPU Q203 stores the information supplied to the input ports K1 to K8 and reads the input state. The output port 11 delivers a pulse oscillation of 100 to 200 μsec serving as a dynamic scanning signal for a matrix during an ordinary operation. And in an abnormal operation such as jam or the like, it delivers a static signal or a pulse oscillation of 0.6 sec on/0.6 sec off. In the normal operation with 100 to 200 μs pulse oscillation, a capacitor (not shown) connected to the output port R11 absorbs the pulse oscillation, and keeps the jam display 48*b* not illuminated.

In the control circuit shown in FIG. 22, connections of the output ports R0 to R11, R14, 00 to 07 are shown in FIG. 18 similarly to the first embodiment. As shown in the figure, the output ports R0 to R11, R14, 00 to 07 of the CPU Q203a are separately connected in order to independently control respective sections. More in particular, the output port R0 is not commonly used, the output port R1 is connected to a cassette paper feeder solenoid SL301, the output port R2 is to the original board advance solenoid SL2, the output port R3 is to the original board stop solenoid SL1, the output port R4 is to the registration shutter solenoid SL3, the output port R5 is to the power source lamp 48*a*, the output port R6 is to a bias circuit enabling to adjust the intensity of the image by the intensity adjustment lever 47, the output port R7 is to a high voltage circuit HV, the output port R8 is to the main motor M1 driving the photosensitive drum and the like and a pre-exposure lamp LA2, the output port R9 is to the halogen lamp LA1, the output port R10 is to the halogen heater H1, the output port R11 is to the paper feeding solenoid SL4, and the output port R11 is connected to the jam display 48*b*, respectively. The output ports 00 to 07 are connected to the segment display 46*a*.

The signals from the output ports R7 and R3 are connected to a jack (not shown) to obtain therefrom an OR signal, the OR signal being set so as to become on at the starting time of copying and to become off at the end of the copying. In the case that all papers are used during the continuous copying, the OR signal is set as an on signal due to the presence of the signal from the output port R3. The on signal is used for sorting operation.

Figure 24:
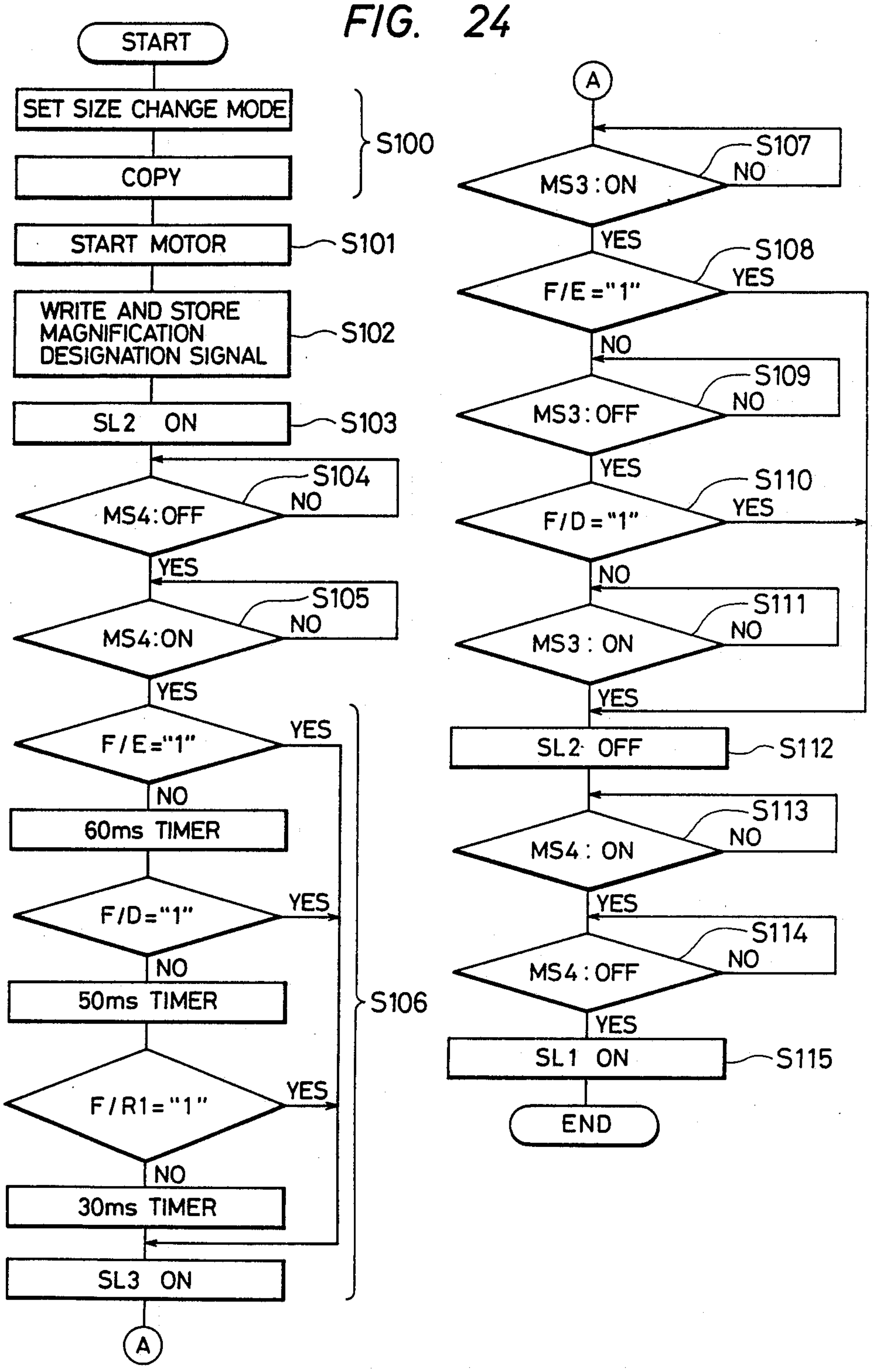

FIG. 24 shows a processing sequence by the CPU Q203a with respect to the movement control of the original board 1 and the registration timing setting and the like in each mode which have been described with reference to FIGS. 6 to 8.

First, at a step S100, a magnification ratio is set by an operator using the size change setting dial 2*a*, and upon depression of the copy key 46*a*, the motor rotates at a step S101 to move the original board 1. The moving speed of the original board 1 and the position of the lens 2 are mechanically locked in accordance with the magnification ratio, and the original board 1 is positioned at a start position.

At the step S102, a magnification signal is read from the rotary switches SW701-A and SW701-B at a time instant just before the original board 1 is moved forward, and the magnification ratio as shown in Table 4 is recognized. If either the magnification mode or the B5 mode is employed, a flag F/E indicative of such state is set as "1", if the equal size mode is employed, a flag F/D indicative of such state is set as "1", if the reduction 1 mode is employed, a flag F/Rl indicative of such state is set as "1", and if the single size change mode is employed, a flag F/0 indicative of such state is set as "1". In a step S103, the original board advance solenoid SL2 is turned on to initiate the advance of the original board 1.

At a step S104, it is ensured that the microswitch MS4 passes over the start position cam C3. At a step S105, it is ensured that the microswitch MS4 detects the registration position cam C2.

At a step S106, the registration timing at each magnification ratio is determined in accordance with the flag set at the step S102, for example, as shown in the figure, and the registration shutter solenoid SL3 is turned on. At a step S107, the turning on of the microswitch MS3 by the original board reverse cam C5 is detected. At a step S108, if the present status is judged as the magnification mode or the B5 mode, then a step S112 follows wherein the original board advance solenoid SL2 is turned off to start to move backward.

If the present status is not the magnification mode or the B5 mode, a step S109 follows. After the microswitch MS3 turns off with the original board reverse cam C5 passing over the microswitch MS3, then at a step S110, if the present status is judged as the equal size mode, a step S112 follows to move the original board backward.

At the step S110, if the present status is judged as not the equal size mode, that is, if the present status is the reduction 1 mode, reduction 2 mode, or single size change ode, a step S111 follows. At the time instant when the microswitch MS3 turns off by the reverse cam C4, the step S112 follows.

Succeedingly, at a step S113, the microswitch MS4 detects the stop position cam C1, and at a step S114, the cam C1 continues to pass on the microswitch MS3 until the former passes over the latter. At this time instant, a step S115 follows to make the original board stop solenoid turn on to thereby stop the original board 1, and the copying operation is terminated.

The present invention should not be limited to the embodiments described above, but various modifications are possible which fall within the scope of the appended claims.

What is claimed is:

1. An image forming apparatus comprising:

an optical system for projecting an original image, said optical system including a lens associated with a magnification factor for image formation;

means for forming an image projected through said optical system onto a recording medium;

means for manually setting a magnification factor;

means for moving said lens;

a locking member for mechanically locking said lens moved by said moving means at a position corresponding to the magnification factor set by said setting means;

means for detecting the position at which said lens is locked by said locking means; and means for discriminating the magnification factor set by said setting means on the basis of an output from said detection means to control said optical system and said image forming means.

2. An image forming apparatus according to claim 1, wherein said image forming means includes erasing means for erasing an image on an area other than that of the original image, and said control means controls said erasing means in accordance with an output from said detecting means.

3. An image forming apparatus according to claim 1, wherein said optical system includes scanning means for scanning the original, and said control means controls said scanning means in accordance with the information detected by said detection means.

4. An image forming apparatus according to claim 1, wherein said detection means includes a cam and a microswitch which detect the set position of said lens.

5. A image forming apparatus comprising:

an optical system for scanning an image of an original;

means for feeding a recording medium;

means for forming an image scanned by said optical system onto the recording medium; and control means for varying a magnification factor for image formation, wherein when said control means independently varies the magnification factors relating to a scanning direction and a direction perpendicular thereto, said control means changes the perpendicular position for image formation on the recording medium;

wherein said control means changes a position of an image by varying a feed timing of the recording medium.

6. An image forming apparatus according to claim 5, wherein said control means varies only a magnification factor relating to a scan direction of the original.

7. An image forming apparatus according to claim 6, wherein said control means controls a timing of the feed of the recording medium by said feeding means.

8. An image forming apparatus according to claim 7, wherein said control means controls the timing of feed to form an image in the center of the recording medium.

9. An image forming apparatus according to claim 3, wherein said control means controls a scanning speed of said scanning means.

10. An image forming apparatus according to claim 1, wherein said setting means includes a movable member.

11. An image forming apparatus comprising:

an optical system for scanning an image of an original, said optical system including a lens associated with a magnification factor for image formation;

means for feeding a recording medium;

means for forming an image scanned by said optical system onto the recording medium; and control means for reducing only a magnification factor for image formation relating to a scan direction of the original, wherein when said control means varies the magnification factor, said control means shifts the position of the image formed on the recording medium from a reference position;

said control means being adapted to set the lens at a position for real size image formation.

12. An image forming apparatus according to claim 11, wherein said control means controls a timing for the feed of the recording medium by said feeding means to shift the position of the image formed on said recording medium.

* * * * *

UNITED STATES PATENT AND TRADEMARK OFFICE

CERTIFICATE OF CORRECTION

PATENT NO. : 4,905,042

DATED : February 27, 1990

INVENTOR(S) : SOHEI TANAKA, ET AL.

It is certified that error appears in the above-identified patent and that said Letters Patent is hereby corrected as shown below:

COLUMN 4

Line 36, "black-lamp LA3" should read --black-out lamp LA3--.
Line 40, "with hand" should read --by hand--.

COLUMN 5

Line 10, "to" should read --for--.

COLUMN 7

Line 40, "that" should be deleted.

COLUMN 8

Line 68, "4." should read --47.--.

COLUMN 9

Line 61, "of" should read --on--.
Line 68, "of" should read --on--.

COLUMN 10

Line 8, "is" should read --are--.
Line 28, "reference R901 to R914" should read --references R901 to R914--.

UNITED STATES PATENT AND TRADEMARK OFFICE

CERTIFICATE OF CORRECTION

PATENT NO. : 4,905,042

DATED : February 27, 1990

INVENTOR(S) : SOHEI TANAKA, ET AL.

It is certified that error appears in the above-identified patent and that said Letters Patent is hereby corrected as shown below:

COLUMN 10

Line 29, "reference D901 to D903" should read --references D901 to D903--.

Line 30, "ence" should read --ences-- and "reference" should read --references--.

COLUMN 11

Line 38, "a power i" should read --power is--.

Line 61, "is not proceeded." should read --does not proceed.--.

COLUMN 13

Line 20, "is" should read --are--.

COLUMN 14

Line 10, "of" should read --on--.

COLUMN 15

Line 20, "have" should read --has--.

COLUMN 16

Line 7, "equal size magnification" should read --equal size mode--.

Line 67, "a" should be deleted.

UNITED STATES PATENT AND TRADEMARK OFFICE
CERTIFICATE OF CORRECTION

PATENT NO. : 4,905,042

DATED : February 27, 1990

INVENTOR(S) : SOHEI TANAKA, ET AL.

It is certified that error appears in the above-identified patent and that said Letters Patent is hereby corrected as shown below:

COLUMN 17

Line 25, "is not proceeded." should read --does not proceed.--.

COLUMN 19

Line 11, "ode," should read --mode,--.

COLUMN 20

Line 4, "A" should read --An--.

Signed and Sealed this

Twenty-eighth Day of July, 1992

Attest:

DOUGLAS B. COMER

*Attesting Officer* — *Acting Commissioner of Patents and Trademarks*